US006637647B2

(12) United States Patent
Katou et al.

(10) Patent No.: US 6,637,647 B2

(45) Date of Patent: Oct. 28, 2003

(54) BILL DEPOSIT/WITHDRAWAL MACHINE

(75) Inventors: Riichi Katou, Nagoya (JP); Kunihisa Matsuura, Aichi (JP); Itsunori Utsumi, Owariasahi (JP)

(73) Assignee: Hitachi, Ltd., Tokyo (JP)

(*) Notice: Subject to any disclaimer, the term of this patent is extended or adjusted under 35 U.S.C. 154(b) by 59 days.

(21) Appl. No.: 10/096,860

(22) Filed: Mar. 14, 2002

(65) Prior Publication Data

US 2002/0088850 A1 Jul. 11, 2002

Related U.S. Application Data

(63) Continuation of application No. 09/339,932, filed on Jun. 25, 1999, now abandoned.

(30) Foreign Application Priority Data

Jun. 26, 1998 (JP) .......................................... 10-180278
Jun. 29, 1998 (JP) .......................................... 10-182050

(51) Int. Cl.[7] ................................................ G06K 5/00

(52) U.S. Cl. ...................................................... 235/379

(58) Field of Search ................................ 235/375, 379, 235/380

(56) References Cited

U.S. PATENT DOCUMENTS

| | | | | | |
|---|---|---|---|---|---|
| 4,524,268 | A | * | 6/1985 | Fukatsu | 235/379 |
| 4,577,763 | A | * | 3/1986 | Placke et al. | 209/534 |
| 4,980,543 | A | * | 12/1990 | Hara et al. | 235/379 |
| 5,021,639 | A | * | 6/1991 | Hara et al. | 235/379 |
| 6,006,209 | A | * | 12/1999 | Takeuchi et al. | 705/40 |

FOREIGN PATENT DOCUMENTS

GB 2217086 * 10/1999

* cited by examiner

*Primary Examiner*—Mark Tremblay
(74) *Attorney, Agent, or Firm*—Antonelli, Terry, Stout & Kraus, LLP

(57) ABSTRACT

A bill transaction machine for transacting a bill. The machine includes a plurality of accepting boxes for accepting bills to be transacted each of the accepting boxes being mounted detachably and having the same outside dimension. A controller and a method thereof is provided for setting a condition for operation of the bill transaction machine.

29 Claims, 17 Drawing Sheets

FIG. 15

| | MACHINE SIDE | INPUT SET BY CLERK IN CHARGE | |
|---|---|---|---|
| | PRESENCE /ABSENCE | TYPE | KIND OF BILL |
| ACCEPTING BOX 1 | PRESENT | REJECT BOX | NOT PRESCRIBED |
| ACCEPTING BOX 2 | PRESENT | DEPOSIT BOX | US$ ALL KINDS |
| ACCEPTING BOX 3 | PRESENT | WITHDRAWAL BOX | US$10 |
| ACCEPTING BOX 4 | PRESENT | RECYCLE BOX | JAPANESE ¥1000 |
| ACCEPTING BOX 5 | PRESENT | RECYCLE BOX | JAPANESE ¥10000 |
| ACCEPTING BOX 6 | ABSENT | — | — |
| ACCEPTING BOX 7 | ABSENT | — | — |
| ACCEPTING BOX 8 | ABSENT | — | — |

FIG. 16

| | | | | | | |
|---|---|---|---|---|---|---|
| ¥ DEPOSIT | ¥ WITHDRAWAL | ¥ DEPOSIT | ¥ WITHDRAWAL | PASSBOOK ENTRY | PAYMENT | . . . |

FIG. 17

| OPERATING MODE | 1 | | 2 | | 3 | | 4 | |
|---|---|---|---|---|---|---|---|---|
| | TYPE | KIND OF BILL | TYPE | KIND OF BILL | TYPE | KIND OF BILL | TYPE | KIND OF BILL |
| ACCEPTING BOX 1 | REJECT BOX | NOT PRESCRIBED | REJECT BOX | NOT PRESCRIBED | REJECT BOX | BILLS EX-CEPTING THE FOLLOWING | REJECT & DEPOSIT BOX | BILLS OTHER THAN BILLS FOR WITHDRAWAL |
| ACCEPTING BOX 2 | DEPOSIT BOX | US$ ALL KINDS | RECYCLE BOX | JAPANESE ¥1000 | DEPOSIT BOX | SINGAPORE $10 | WITHDRAWAL BOX | SINGAPORE $10 |
| ACCEPTING BOX 3 | WITHDRAWAL BOX | US $10 | RECYCLE BOX | JAPANESE ¥10000 | DEPOSIT BOX | SINGAPORE $50 | WITHDRAWAL BOX | SINGAPORE $50 |
| ACCEPTING BOX 4 | RECYCLE BOX | JAPANESE ¥1000 | RECYCLE BOX | JAPANESE ¥10000 | DEPOSIT BOX | SINGAPORE $100 | WITHDRAWAL BOX | SINGAPORE $100 |
| ACCEPTING BOX 5 | RECYCLE BOX | JAPANESE ¥10000 | LOAD/ RECOVERY BOX | JAPANESE ¥10000 | DEPOSIT BOX | SINGAPORE $500 | WITHDRAWAL BOX | SINGAPORE $500 |

FIG. 18

| OPERATING MODE | 1 | | 2 | | 3 | | 4 | |
|---|---|---|---|---|---|---|---|---|
| | TYPE | KIND OF BILL | TYPE | KIND OF BILL | TYPE | KIND OF BILL | TYPE | KIND OF BILL |
| ACCEPTING BOX 1 | REJECT BOX | NOT PRESCRIBED | REJECT BOX | NOT PRESCRIBED | REJECT BOX | NOT PRESCRIBED | REJECT BOX | NOT PRESCRIBED |
| ACCEPTING BOX 2 | WITHDRAWAL BOX | US $1 | RECYCLE BOX | US $1 | WITHDRAWAL BOX | SINGAPORE $1 | DEPOSIT BOX | SINGAPORE $10 |
| ACCEPTING BOX 3 | WITHDRAWAL BOX | US $10 | RECYCLE BOX | US $10 | WITHDRAWAL BOX | SINGAPORE $5 | DEPOSIT BOX | SINGAPORE $50 |
| ACCEPTING BOX 4 | WITHDRAWAL BOX | US $100 | RECYCLE BOX | US $100 | WITHDRAWAL BOX | SINGAPORE $10 | WITHDRAWAL BOX | SINGAPORE $10 |
| ACCEPTING BOX 5 | RECYCLE BOX | JAPANESE ¥1000 | RECYCLE BOX | JAPANESE ¥1000 | WITHDRAWAL BOX | SINGAPORE $50 | WITHDRAWAL BOX | SINGAPORE $50 |
| ACCEPTING BOX 6 | RECYCLE BOX | JAPANESE ¥10000 | RECYCLE BOX | JAPANESE ¥10000 | WITHDRAWAL BOX | SINGAPORE $100 | RECYCLE BOX | SINGAPORE $100 |
| ACCEPTING BOX 7 | LOAD/ RECOVERY BOX | JAPANESE ¥1000 ¥10000 | LOAD/ RECOVERY BOX | KINDS FOR ACCEPTING BOXES 2 TO 6 | WITHDRAWAL BOX | SINGAPORE $500 | RECYCLE BOX | SINGAPORE $500 |

BILL DEPOSIT/WITHDRAWAL MACHINE

CROSS-REFERENCE TO RELATED APPLICATIONS

This application is a continuation of application Ser. No. 09/339,932 filed on Jun. 25, 1999, now abandoned, the contents of which are hereby incorporated herein by reference in their entirety.

This application is related to application Ser. No. 10/096,863 filed on Mar. 14, 2002, now U.S. Pat. No. 6,474,549, which, like the present application, is a continuation of application Ser. No. 09/339,932.

BACKGROUND OF THE INVENTION

The present invention relates to a bill deposit/withdrawal machine (for example, an automated teller machine used in a banking organ or the like) for which a general user makes the deposit and withdrawal of a cash directly by use of a card, passbook or the like.

The conventional bill deposit/withdrawal machine used in, for example, a banking organ or the like is provided with a deposit/withdrawal port for delivering bills (or paper money) inputted by a user and accepting bills to be discharged to a user, a bill discriminating unit for discriminating bills, and a bill transport path for transporting bills while passing them through the bill discriminating unit. The construction of the machine further includes the combination of units including a temporary storage box for storing deposited bills once, a deposit box for accepting deposited bills, a withdrawal box for delivering bills for withdrawal, a recycle box for accepting and delivering bills for both deposit and withdrawal, a reject box for accepting bills which are transmitted from the withdrawal box, but not transmitted to the deposit/withdrawal port, a load/recovery box for delivering bills to be supplemented for the recycle box and accepting bills recovered from the recycle box, and so forth. Various constructions have been proposed for the arrangement of those units and the overall construction. For example, there has been proposed a complicated construction having a character "8"-configured transport path which includes two ring-like transport paths passing through the bill discriminating unit.

Three kinds of bills including a 1,000-yen bill, a 5,000-yen bill and a 10,000-yen bill are handled in Japanese territory. A bill deposit/withdrawal machine mounted with a recycle box capable of accepting 1,000-yen bills and 10,000-yen bills at a large capacity every that bill kind is popularly provided. However, only a small number of bill deposit/withdrawal machines is capable of coping with countries such as countries in Europe and America or countries in Southeast Asia where many kinds of bills are circulated. An example of a bill deposit/withdrawal machine capable of handling many kinds of bills has been disclosed by, for example, JP-A-7-267513. This known machine is provided with a deposit port, a withdrawal port, a bill discriminating unit (or bill discriminator), a reject box, and a plurality of recycle boxes for respective kinds of bills so that these units are connected by a bill transport path and the recycle boxes can additionally be provided in accordance with the number of handled bill kinds (see FIG. 19).

With the pervasion of bill deposit/withdrawal machines, there is an increasing need for smaller size, lower cost and more easiness in use while improved functions such as a recycle function of circulating deposited bills as bills for withdrawal and a load/recovery function of delivering bills to be supplemented for a recycle box and accepting bills recovered from the recycle box are ensured. Regarding bills to be handled, on the other hand, there is required a machine which can handle not only Japanese yen bills but also foreign bills with the increase of handling of foreign bills in the territory of Japan and the increase of a need for bill deposit/withdrawal machines outside the territory of Japan. Accordingly, it is desired to provide a bill deposit/withdrawal machine which can handle not only the deposit/withdrawal of two or three kinds of Japanese yen bills as in the prior art but also the deposit/withdrawal of many kinds of bills inclusive of Japanese yen bills and U.S. dollar bills and a bill deposit/withdrawal machine which can cope with the handling of five or more kinds of bills as in countries in Europe and America or countries in Southeast Asia.

Bills circulated in countries in Europe and America or countries in Southeast Asia comprise many kinds. Also, in many cases, the bills have their sizes which are greatly different in both longitudinal and lateral directions in accordance with the kinds of bills. Further, when seen from the circulating situation of bills in each country, the conditions of many bills including the degrees of fold and breaking are poor as compared with those of Japanese yen bills. This type of machine is requested to operate for a whole day in an unmanned manner at an automated-machine corner of a banking organ and to operate with a high reliability for the user's cash deposit/withdrawal transaction. Also, it is desired to provide a bill deposit/withdrawal machine in which a failure such as a paper or bill jam is reduced to cope with the circulating situation of bills in each country.

SUMMARY OF THE INVENTION

A first object of the present invention is to provide a bill deposit/withdrawal machine in which a transaction operation based on the types of transactions or the kinds of bills can be set in accordance with mounted accepting boxes.

A second object of the present invention is to provide a bill deposit/withdrawal machine in which the number of accepting boxes can be increased or decreased.

A third object of the present invention is to provide a bill deposit/withdrawal machine which has a simplified bill transport path construction.

A fourth object of the present invention is to provide a bill deposit/withdrawal machine in which an improved operability is offered in conjunction with the handling of bill boxes by a clerk in charge and an operation performed by the clerk in charge at the time of generation of an abnormal condition such as a bill jam.

A fifth object of the present invention is to provide a bill deposit/withdrawal machine which has a high general-purpose ability.

To attain the above object, one aspect of the present invention provides a bill deposit/withdrawal machine for which a plurality of detachable accepting boxes for accepting bills can be mounted, wherein the accepting box includes at least one of a deposit box for accepting deposited bills, a withdrawal box for accepting bills for withdrawal, a recycle box for accepting bills for both deposit and withdrawal, a reject box for accepting deposited bills which are not accepted into the deposit box and the recycle box and those ones bills delivered from the withdrawal box and the recycle box which are not used for withdrawal, and a load/recovery box for delivering bills to the recycle box or accepting bills recovered from the recycle box, and setting means for setting a transaction operation based on the types of transactions or the kinds of bills in accordance with the mounting state of the accepting boxes is provided.

According to another aspect of the present invention, there is provided a bill deposit/withdrawal machine comprising a deposit/withdrawal port for delivering bills inputted by a user and discharging bills for deposit return (or bills to be returned as deposit rejection) and bills for withdrawal to a user, a bill discriminating unit for discriminating bills, a plurality of accepting boxes for accepting a plurality of bills in a manner stacked in a horizontal direction, the accepting boxes being detachable in the horizontal direction, and a bill transport path for transporting bills between the accepting boxes and the deposit/withdrawal port while passing the bills through the bill discriminating unit, wherein the plurality of accepting boxes are stack-layered in a vertical direction while the deposit/withdrawal port, and the bill discriminating unit and the bill transport path are arranged at positions different from an upper space in the vertical direction in which the accepting boxes are stack-layered, whereby the accepting boxes and the bill transport path to the accepting boxes can be increased or decreased in number in the vertical direction.

BRIEF DESCRIPTION OF THE DRAWINGS

FIG. 15 shows an example of a display window for the setting and input of operation conditions by a clerk in charge in the embodiment of the present invention;

FIG. 16 shows an example of display on a transaction display unit;

FIG. 17 shows an example of operation of five accepting boxes;

FIG. 18 shows an example of operation of seven accepting boxes; and

DESCRIPTION OF THE EMBODIMENTS

Embodiments of the present invention will now be described in reference to the drawings.

Figure 1:
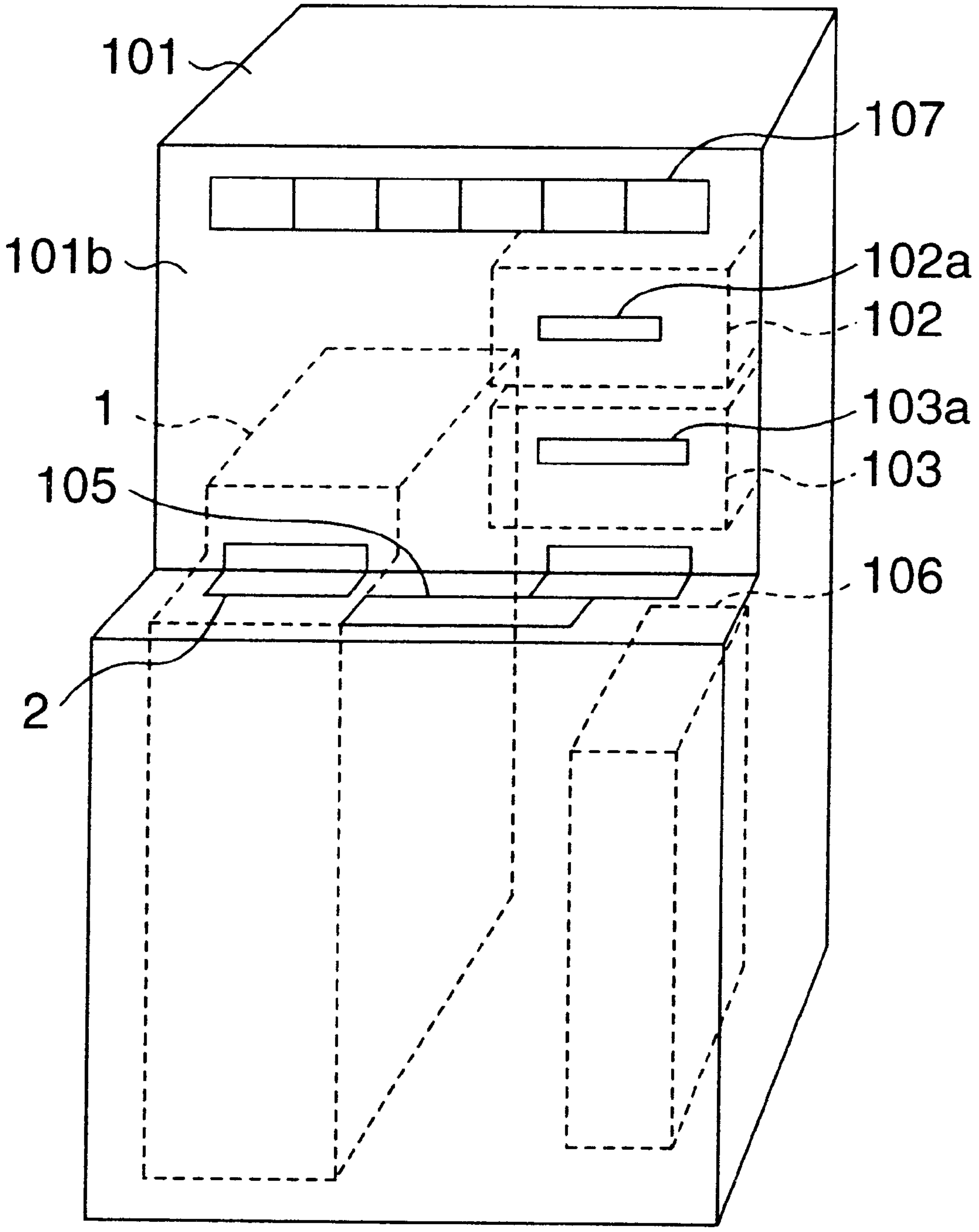
FIG. 1 is a perspective view showing the external appearance of an embodiment of an automated teller machine to which the present invention is applied.

FIG. 1 is a perspective view showing the external appearance of an embodiment of an automated teller machine to which the present invention is applied.

An upper portion of a body casing 101 of the machine is provided with a card/slip processing mechanism 102 which communicates with a card slot 102*a* provided in an upper front plate 101*b* of the casing 101 to process a user's card and prints and delivers a transaction particulars slip, and a passbook processing mechanism 103 which communicates with a passbook slot 103*a* to process a user's passbook.

A lower portion of the body casing 101 is provided with a bill deposit/withdrawal mechanism 1 for processing bills, and an intermediate portion thereof is provided with a customer operation section 105 for displaying and inputting the contents of a transaction. Reference numeral 106 denotes a body control section for performing the control of the whole of the automated teller machine. Numeral 107 denotes a transaction display unit for indicating the types of possible transactions inclusive of deposit and withdrawal to a user.

Figure 2:
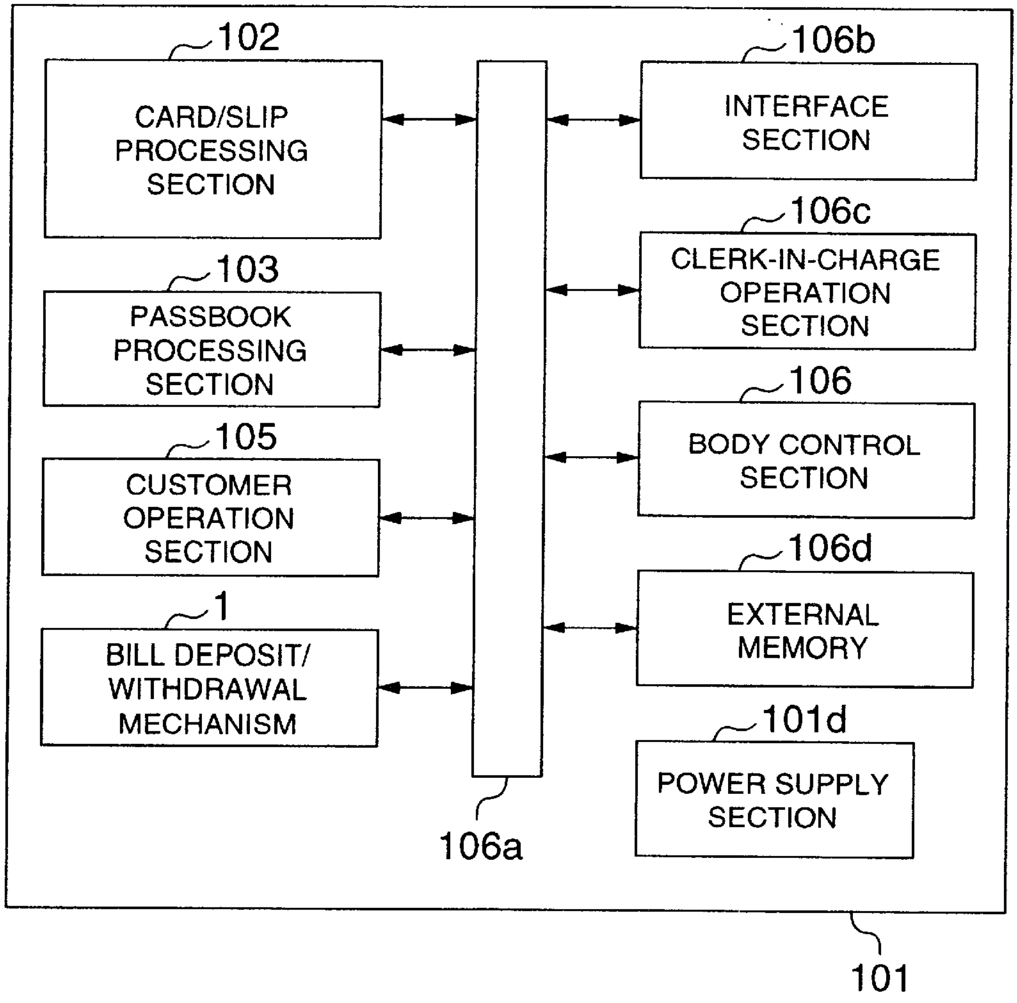
FIG. 2 is a block diagram showing a relation in control of the automated teller machine shown in FIG. 1.

FIG. 2 is a block diagram showing a relation in control of the present machine. The card/slip processing mechanism 102, the passbook processing mechanism 103, the bill deposit/withdrawal mechanism 1 and the customer operation section 105 provided in the body casing 101 are connected to the body control section 106 through a bus 106*a* and perform their required operations under the control of the body control section 106. Though the body control section 106 is also connected through the bus 106*a* to an interface section 106*b*, a clerk-in-charge operation section 106*c* and an external memory 106*d* to make the communication of necessary data therewith, the detailed description thereof will be omitted since there is no direct relation with the features of the present invention. Reference numeral 101*d* shown in FIG. 2 denotes a power supply section for supplying electric powers to the above-mentioned mechanisms and components.

Figure 3:
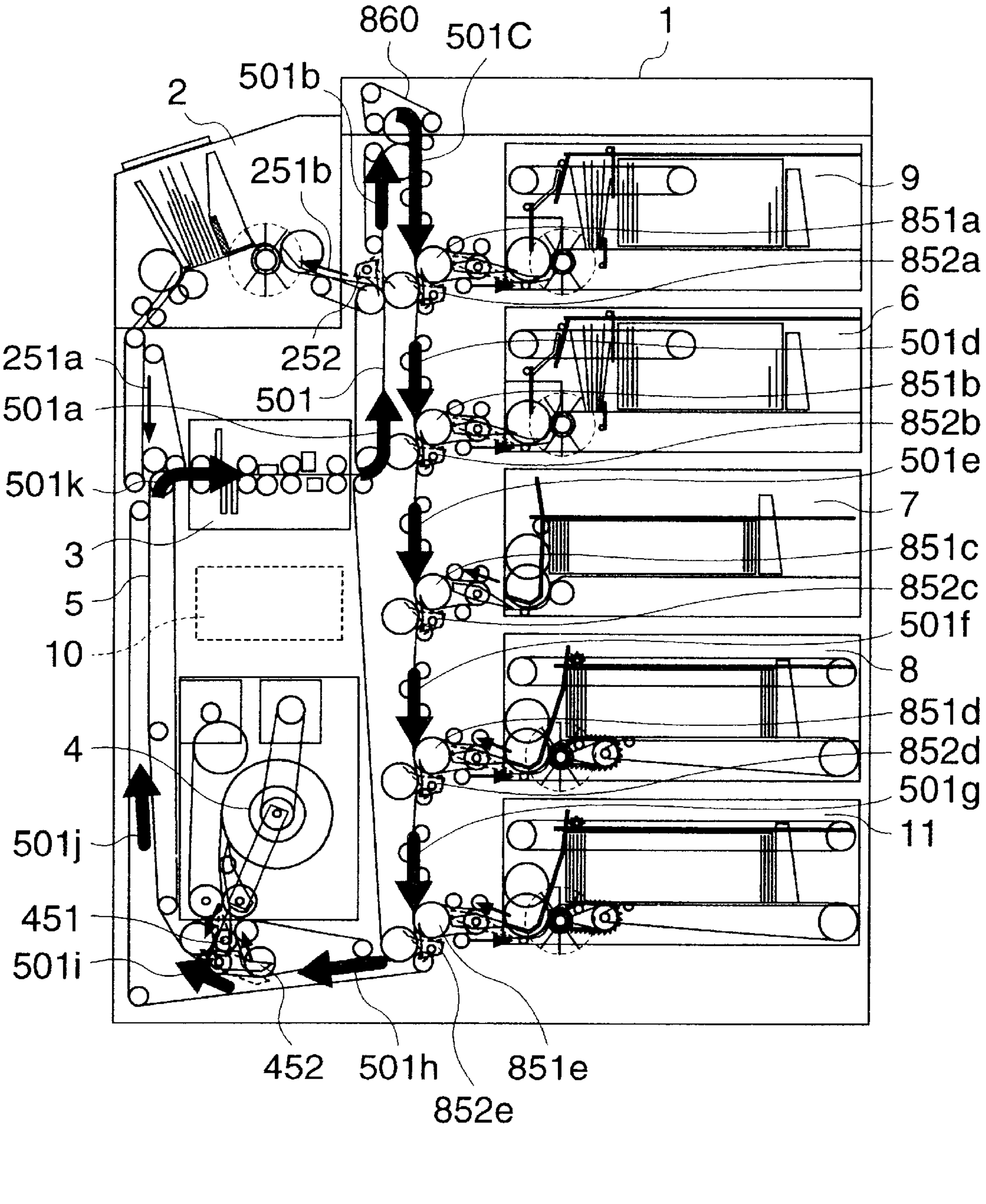
FIG. 3 is a side view showing a first embodiment of a bill deposit/withdrawal mechanism according to the present invention.

FIG. 3 is a side view showing the construction of that bill deposit/withdrawal mechanism 1 in the automated teller machine shown in FIG. 1 to which the present invention relates.

The bill deposit/withdrawal mechanism 1 is composed of a deposit/withdrawal port 2 for which a user makes the input/take-out of bills, a bill discriminating unit 3 for discriminating bills, a temporary storage box 4 for accepting deposited bills once until the materialization of a transaction, one deposit box 6 for accepting, at the time of deposit, bills for which the materialization of a transaction is completed, one withdrawal box 7 for accepting bills for withdrawal, one recycle box 8 for both deposit and withdrawal, a reject box 9 for accepting deposited bills which are not accepted into the deposit box and the recycle box and those ones of bills delivered from the withdrawal box which are not used for withdrawal (in other words, a box for accepting bills for which the discrimination by the bill discriminating unit is impossible), a load/recovery box 11 for accepting bills to be supplemented for the recycle box 8 and bills recovered from the recycle box, a bill transport path 5 for transporting bills to the deposit/withdrawal port 2, the temporary storage box 4, the deposit box 6, the withdrawal box 7, the recycle box 8, the reject box 9 and the load/recovery box 11 while passing the bills through the bill discriminating unit 3, and a control unit 10. The control unit 10 performs the control of the bill deposit/withdrawal mechanism 1 in accordance with a command from the body control section 106 and the detection of the state of the bill deposit/withdrawal mechanism 1 and sends the state of the bill deposit/withdrawal mechanism 1 to the body control section 106, as required.

The bill transport path 5 is composed of a single ring-like main bill transport path 501 (including 501*a* to 501*k* indicated by thick solid arrows in FIG. 3) which passes through the bill discriminating unit 3 and then returns to the bill discriminating unit 3 again by way of a branch point to the deposit/withdrawal port 2, confluent/branch points for each of the reject box 9, the deposit box 6, the withdrawal box 7, the recycle box 8 and the load/recovery box 11, and branch/confluent points for the temporary storage box 4 in the mentioned order, and unit transport paths 251*a*, 251*b*, 851*a* to 851*e* and 451 which make the connection between the main bill transport path 501 and the respective units. Above the reject box 9 is provided a U-turn bill transport path 860 which forms a part of the main bill transport path 501.

The path 251*a* is a deposit unit transport path along which bills delivered from the deposit/withdrawal port 2 are transported to the main bill transport path 501 and join the same path 501. The path 251*b* is a withdrawal unit transport path along which the transport from the main bill transport path 501 to the deposit/withdrawal port 2 in a branching manner is made. The paths 851*a* to 851*e* are cassette unit transport paths along which the transport from the main bill transport path 501 to each cassette of the reject box 9, the deposit box 6, the recycle box 8 and the load/recovery box 11 in a branching manner is made and bills delivered from the withdrawal box 7, the recycle box 8 and the load/recovery box 11 are transported to the main bill transport path 501 and join the same path 501. The path 451 is a temporary storage unit transport path along which the transport from the main bill transport path 501 to the temporary storage box 4 in a branching manner is made and bills delivered from the temporary storage box 4 are transported to the main bill transport path 501 and join the same path 501. Further, switching gates 252, 852*a* to 852*e* and 452 are provided at the branch points from the main bill transport path 501 to the unit transport paths 251*b*, 851*a* to 851*e* and 451 so that the transport is controlled by the control unit 10 on the basis of the result of discrimination from the bill discriminating unit 3.

Next, the details of the above-mentioned components 2 to 11 in the present embodiment and the details of the operation will be described using FIGS. 3 to 8.

Figure 4:
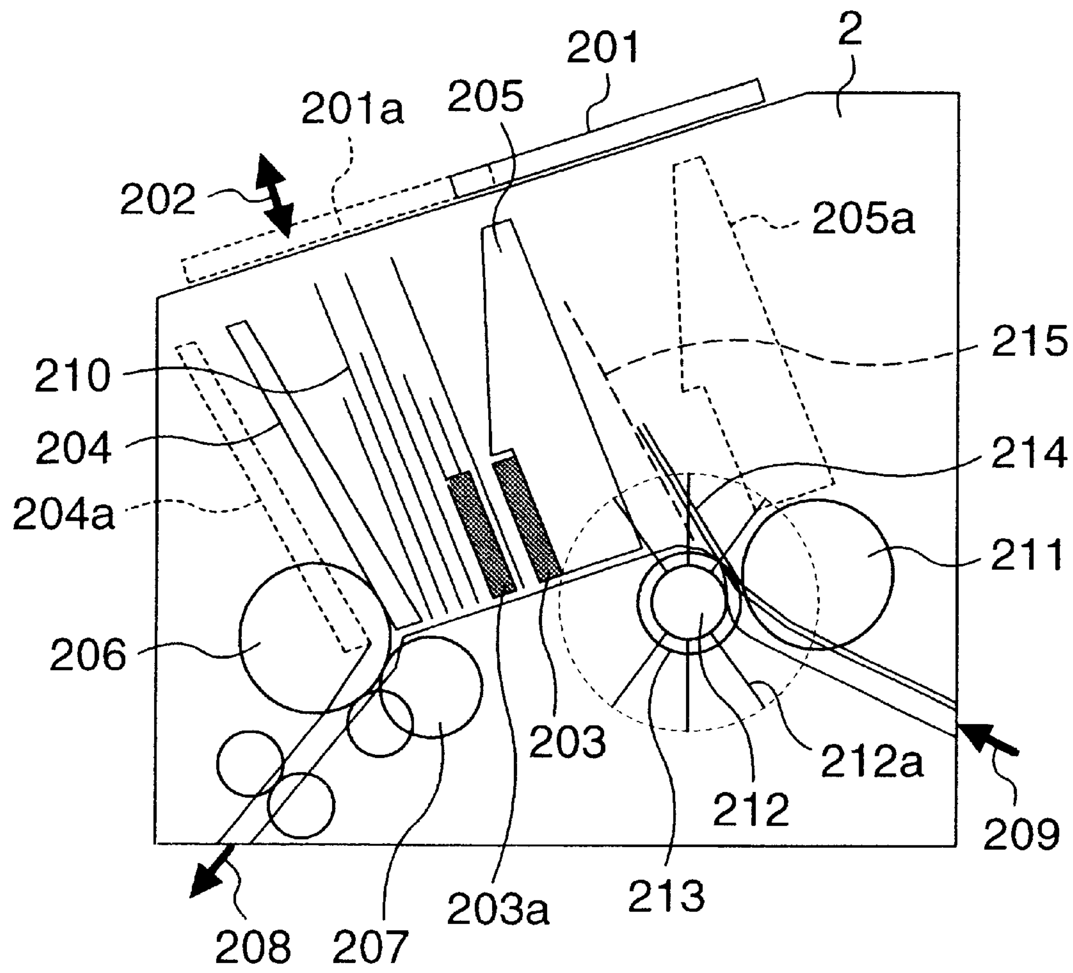
FIG. 4 is a side view of a deposit/withdrawal port in the embodiment of the present invention.

The deposit/withdrawal port 2 has a shutter 201, as shown in FIG. 4. The shutter 201 can be slidden and moved into a state indicated by reference numeral 201*a* and can be opened and closed in that state, thereby allowing the user to take out bills at the time of withdrawal and to input bills at the time of deposit in a direction indicated by arrow 202.

As shown, bills 210 inputted between a front plate 204 and a push plate 203 and a rear plate 205 are pushed by the push plate 203 in a direction of a feed roller 206 so that the push plate and the front plate are brought into the states of 203*a* and 204*a* and the bills are fed forward by a rotating operation of the feed roller 206 while a two-sheet feed is prevented by a gate roller 207 which does not rotate in the direction of delivery. Thus, the bills 210 at the deposit/withdrawal port 2 are delivered in a direction indicated by arrow 208 so that they join the main bill transport path 501 and are then taken into the machine.

Also, bills withdrawn from the machine and bills rejected for reasons such as the difficulty in bill discrimination at the time of deposit or the like branch off from the main bill transport path 501 and are transported in a direction of arrow 209 so that they are sent between a rotating stack roller 211 and a backup roller 213. A brush roller 212 is disposed on the same axis as the backup roller 213 and has elastic members 212*a* radially arranged, as shown. The brush roller 212 is rotated by a driving source (not shown) independently of the backup roller 213. The bill sent between the stack roller 211 and the backup roller 213 contacts the elastic member 212*a* of the stopped brush roller 212 and is passed while receiving a frictional resistance force against a stack guide 214 owing to an elastic deformation force of the elastic member 212*a*. The bill is stopped once at a bill position indicated by broken line 215 where a sandwiching transport force of the stack roller 211 and the backup roller 213 runs out. Immediately thereafter, the brush roller 212 is rotated so that the bill is stacked in a space between the push plate 203*a* and a rear plate 205*a*. Accordingly, there is not a fear that the bill does not fly out upward in an accepting space. Also, since the bill is merely scratched by the brush roller 212 in a horizontal direction, no interference between continuously transported bills is caused and hence a vertical unevenness is rarely to be caused. Accordingly, it becomes possible for the user to easily take out the bills.

Though the details are not shown, the bill discriminating unit 3 is composed of a two-sheet detecting portion which includes a pair of rollers and detects the displacement of the rollers at the time of transport of bills between the rollers to detect whether or not there is the superimposition of two sheets one over the other, and a discriminating portion which detects the print of a bill by means of an image sensor or the like to discriminate the kind of that bill and the truth or falsehood thereof. The control unit 10 is informed of the result of discrimination for each passed bill.

Figure 5A:
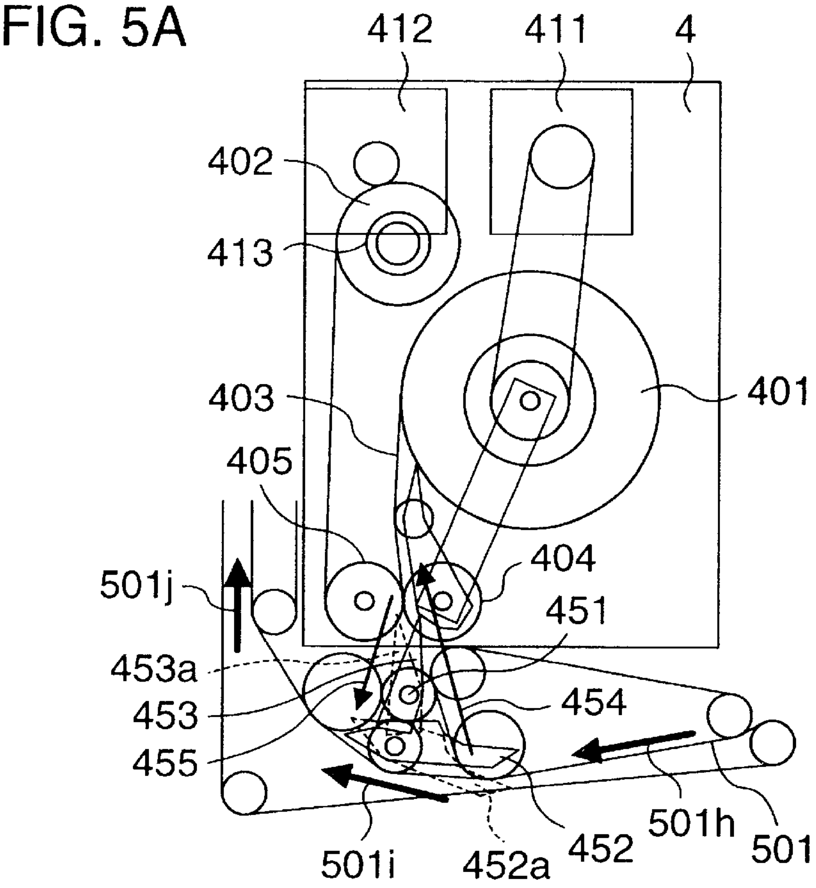
FIG. 5A shows an example of the construction of a temporary storage box in the embodiment of the present invention.
Figure 5B:
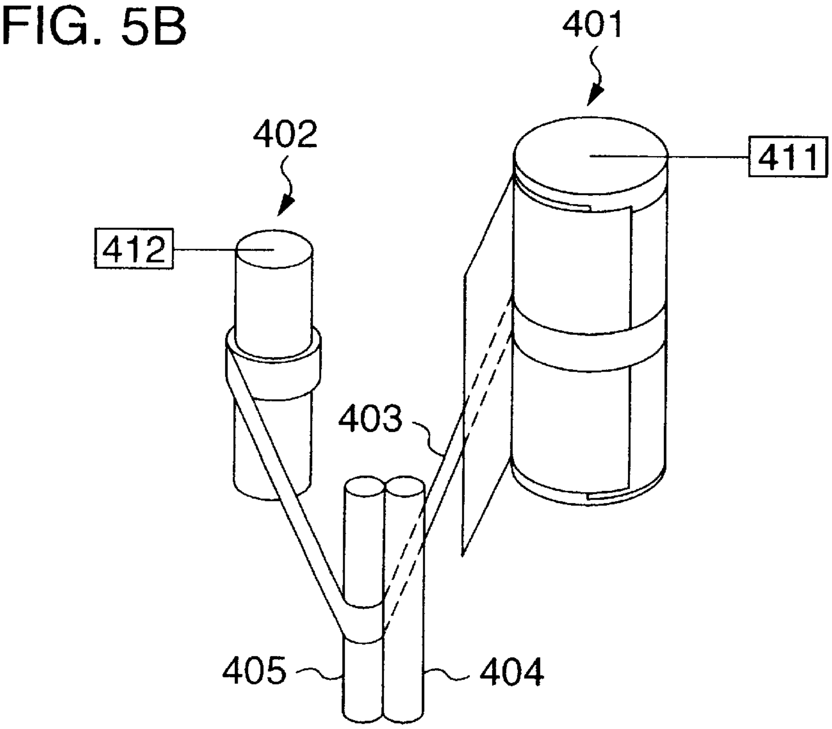
FIG. 5B is a perspective view showing a main part of the temporary storage box.

The temporary storage box 4 has a function of successively accepting bills kind-settled by the bill discriminating unit 3 at the time of deposit transaction, reserving them once until the transaction is materialized, and successively discharging after the materialization of the transaction. As shown in FIGS. 5A and 5B, the temporary storage box 4 is composed of an inducing tape 403 which is made of a thin stainless plate, a rotary drum 401 on which a bill transported together with the inducing tape 403 is wound, a winding shaft 402 on which only the inducing tape 403 is wound, an inlet roller 405 which guides the entrance of a bill to the rotary drum 401 and rotates together with the inducing tape 403, and a backup roller 404 which is provided opposite to the inlet roller 405. FIG. 5A shows an enlarged view of the temporary storage box 4 in the bill deposit/withdrawal mechanism 1 shown in FIG. 3, and FIG. 5B illustrates only a main portion of the temporary storage box in order to facilitate the understanding. The rotary drum 401 and the winding shaft 401 supporting the opposite ends of the inducing tape 403 are respectively connected to separate driving sources 411 and 412. The connection of the winding shaft 402 to the driving source 412 is made through a torque limiter 413.

Also, the temporary storage box unit transport path 451 has a switching gate 452 by which bills transported along the main bill transport path 501 in a direction of arrow 501*h* are taken into the temporary storage box 4, and an inlet/outlet gate 453 which is provided in the vicinity of an inlet/outlet of the temporary storage box 4 for making the switching between the taking of bills into the temporary storage box 4 and the discharge of bills therefrom. Before a deposit transaction, the inducing tape 403 has been wound on the winding shaft 402 side.

The length of a portion of the inducing tape 403 to be wound around the rotary drum 401 is set to at least a length necessary for one deposit count operation determined by the rate of separation of bills from the deposit/withdrawal port, the rate of transport of bills and the limited number of bills capable of being inputted into the deposit/withdrawal port. For example, provided that the limited number of bills capable of being inputted into the deposit/withdrawal port at once is 200 sheets (250 sheets inclusive of an added margin), the separation rate is about 10 sheets per second and the transport rate is about 1.6 m per second, the required length is set to 45 m inclusive of a margin of 5 m on the basis of at least 1.6 (m/sec)×250 (sheets)÷10 (sheets/sec)=40 m.

An initial-position sensor (not shown) for detecting an initial position of the inducing tape 403 and a near-fullness sensor (not shown) for detecting the vicinity of the end of the inducing tape 403 may be provided while an encoder (not shown) for detecting the current winding amount of the inducing tape 403 with the initial position of the inducing tape 403 taken as a reference is attached to the inlet roller 405, so that the control unit 10 makes a timing control or the like by use of signals from the sensors and the encoder. Also, a temporary storage box passage sensor for sensing bills to be accepted in the temporary storage box and discharged therefrom to count the bills may be provided on the transport path from the inlet roller 405 on the rotary drum 401 side.

Before a deposit transaction, the inducing tape 403 has been wound on the winding shaft 402 side up to the initial position. In the case where deposited bills are to be taken into the temporary storage box 403, the driving source 411 is driven in a direction in which the rotary drum 401 winds the inducing tape 403 thereon. The rotary drum 401 rotates so that the travel speed of the inducing tape 403 becomes substantially equal to the entering speed of bills. The switching gate 452 is switched to a direction indicated by 452*a* in FIG. 5A and the inlet/outlet gate 453 is switched to a direction indicated by 453*a*. Thereby, the deposited bills transported in the direction of arrow 501*h* are successively wound on the rotary drum 401 through a route of arrow 454. On the other hand, the winding shaft 402 is driven by the driving source 412 through the torque limiter 413 so that a tensile force is applied to the inducing tape 403. Thereby, the inducing tape 403 is wound on the rotary drum 403 with no slack and together with the bills.

When a deposit transaction for bills accepted in the temporary storage box 4 is materialized, the inlet/outlet gate 453*a* is switched to a direction indicated by 453 and the rotary drum 401 is reversely rotated while the winding shaft 402 is driven in its winding direction through the torque limiter with a tensile force applied to the inducing tape 403. Thereby, the bills wound on the rotary drum 401 are delivered in a direction of the main bill transport path 501 indicated by arrow 501*j* through a route of arrow 455 in a sequence reverse to that at the time of acceptance.

The temporary storage box may be provided with not the winding-type construction based on the rotary drum and the inducing tape as shown in FIGS. 5A and 5B but a stacking-type construction as will be shown later on in conjunction with the recycle box.

Figure 6:
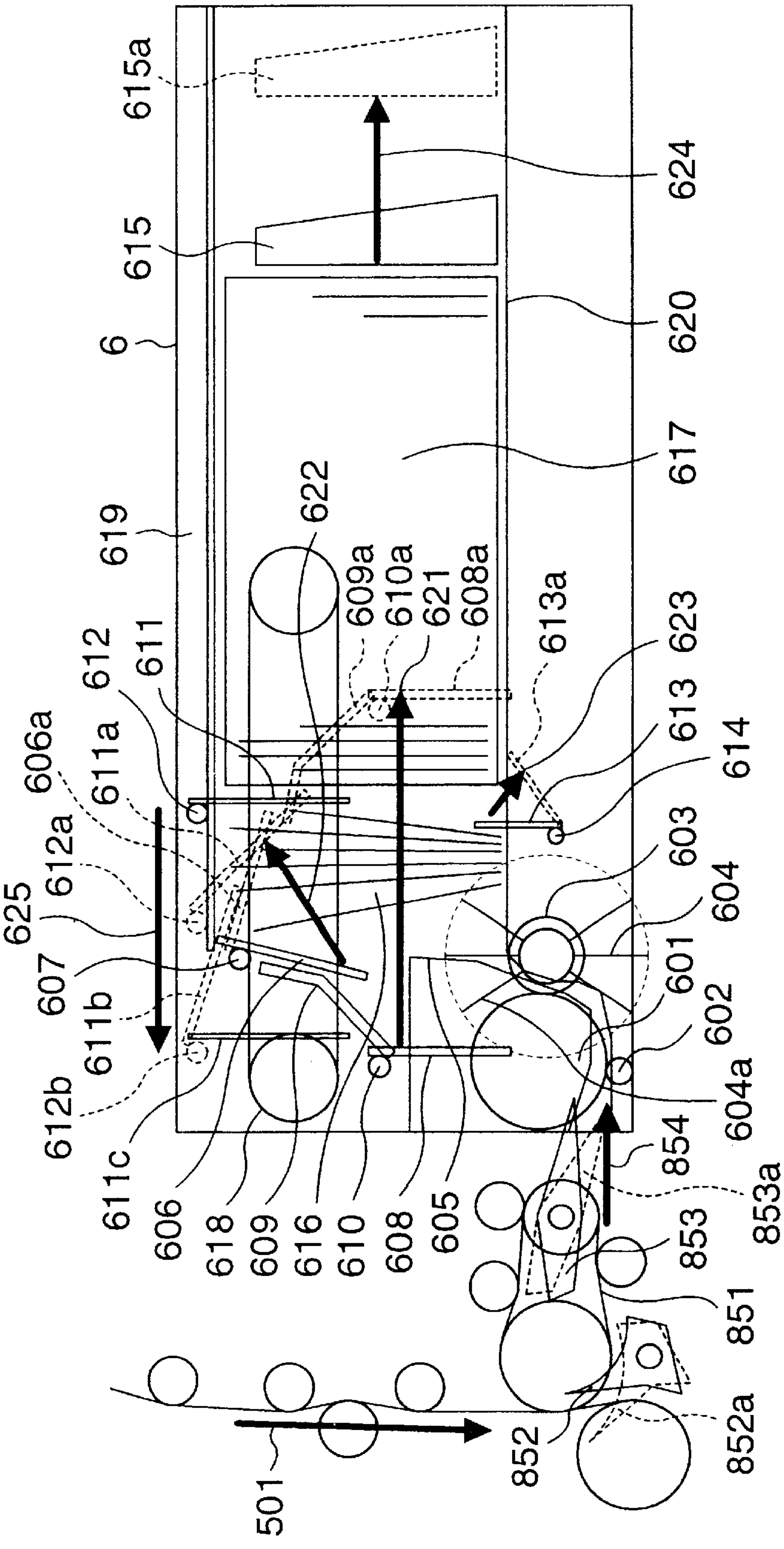
FIG. 6 is a side view of a deposit box in the embodiment of the present invention.

The deposit box 6 is mounted one in number in the present embodiment. As shown in FIG. 6, the deposit box 6 constructs a stack mechanism composed of a rotating stack roller 601 driven through a gear by a driving source (not shown) outside the box 6, backup rollers 602 and 603 opposite to the stack roller 601, a brush roller 604 disposed on the same axis as the backup roller 603 and rotated by a driving source (not shown) independently of the backup roller, the brush roller having elastic members 604*a* radially arranged, as shown, a lower stack guide 605 and an upper stack guide 606. A bill accepting space includes a stacked-bill accepting space 617 which is formed by an upper partition plate 611, a lower partition plate 613 and a push plate 615, and a bill-under-stacking accepting space 616 which is formed by the upper partition plate 611, the lower partition plate 613, the upper stack guide 606 and the lower stack guide 605.

Bills to be accepted in the deposit box 6 are transported in a direction of arrow 854 from the main bill transport path (indicated by arrow 501) with a switching gate 852 switched as indicated by 852*a* and are then sent between the rotating stack roller 601 and the backup rollers 602 and 603. The bill sent between the stack roller 601 and the backup roller 603 contacts the elastic member 604*a* of the stopped brush roller 604 and is passed while receiving a frictional resistance force against the lower stack guide 605 owing to an elastic deformation force of the elastic member 604*a*. The bill is stopped once at a position where a sandwiching transport force of the stack roller 601 and the backup roller 603 runs out. Immediately thereafter, the brush roller 604 is rotated so that the bill is stacked in the above-mentioned bill-under-stacking accepting space 616 with no interference caused between continuously transported bills.

Next, a driving belt 618 is driven by a driving source (not shown) so that a push plate 608, a push assist guide 609, a push support shaft 610 and the upper stack guide 606 coupled to the driving belt 618 are moved up to positions of dotted lines 608*a*, 609*a*, 610*a* and 606*a* in directions of arrows 621 and 622 while the upper partition plate 611 and an upper partition plate support shaft 612 coupled to the driving belt 618 are successively moved to positions of dotted lines 611*a* and 612*a*, to positions of dotted lines 611*b* and 612*b* and to positions of dotted lines 611*c* and 612*b* in a direction of arrow 625. Thereby, the bills stacked in the bill-under-stacking accepting space 616 are pushed into the stacked-bill accepting space 617 together with bills in the stacked-bill accepting space 617 by moving the push plate 615 in a direction of arrow 624 and the lower stack guide 613 in a direction of arrow 623. Next, the driving belt 618 is driven in a reverse direction so that the push plate 608, the push assist guide 609, the push support shaft 610, the upper partition plate 611 and the upper partition plate support shaft 612 are returned to the initial positions to bring the bill-under-stacking accepting space 616 into an empty condition, thereby enabling the next stacking operation.

Figure 7:
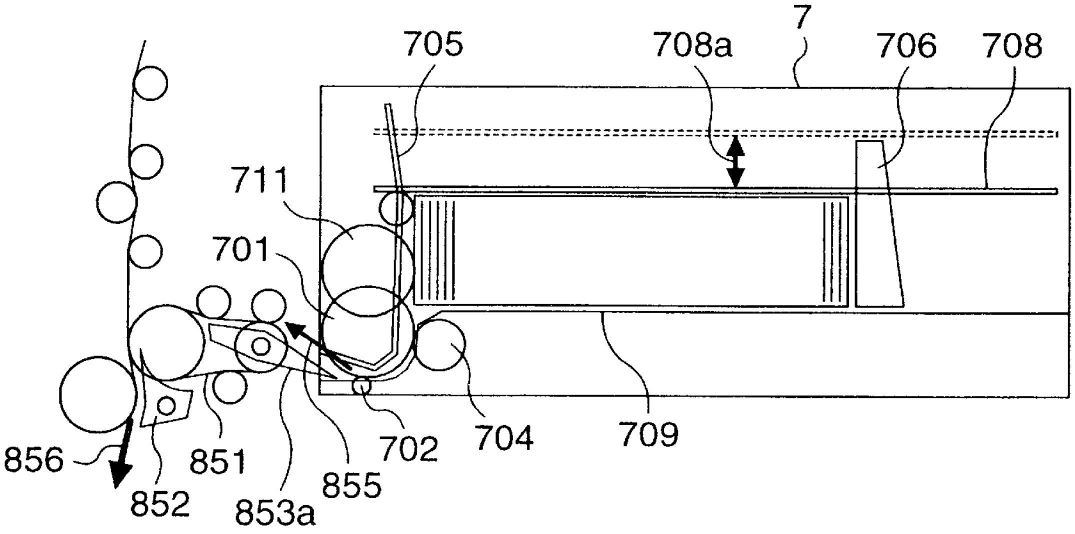
FIG. 7 is a side view of a withdrawal box in the embodiment of the present invention.

The withdrawal box 7 is mounted one in number in the present embodiment. As shown in FIG. 7, the withdrawal box 7 constructs a separation mechanism composed of a rotating feed roller 701 and a rotating pickup roller 711 which are driven through gears by driving sources (not shown) outside the box 7, a rotating backup roller 702 which is provided opposite to the feed roller 701, and a gate roller 704 which is provided opposite to the feed roller 701 and does not rotate in a delivering direction. Bills for withdrawal are set in alignment (or with evenness) by a clerk in charge into an accepting space enclosed by a bottom plate guide 709, a push plate 706, a separation guide 705 and an upper face guide 708 with the foremost bill pushed against the pickup roller 711 by a spring (not shown) coupled to the push plate 706. The push plate 706 is made movable in the accepting space to move the accepted bills so that bills to be delivered impose a predetermined pushing force upon the pickup roller 711 with the decrease in number of accepted bills. The bills pushed against the pickup roller 711 are delivered owing to the operations of the rotating feed and pickup rollers 701 and 711 and are transported one by one in a direction of arrow 855 while a two-sheet feed is prevented by the gate roller 703 which does not rotate in the delivering direction. Then, the bills are transported along the main bill transport path in a direction of arrow 856.

Figure 8:
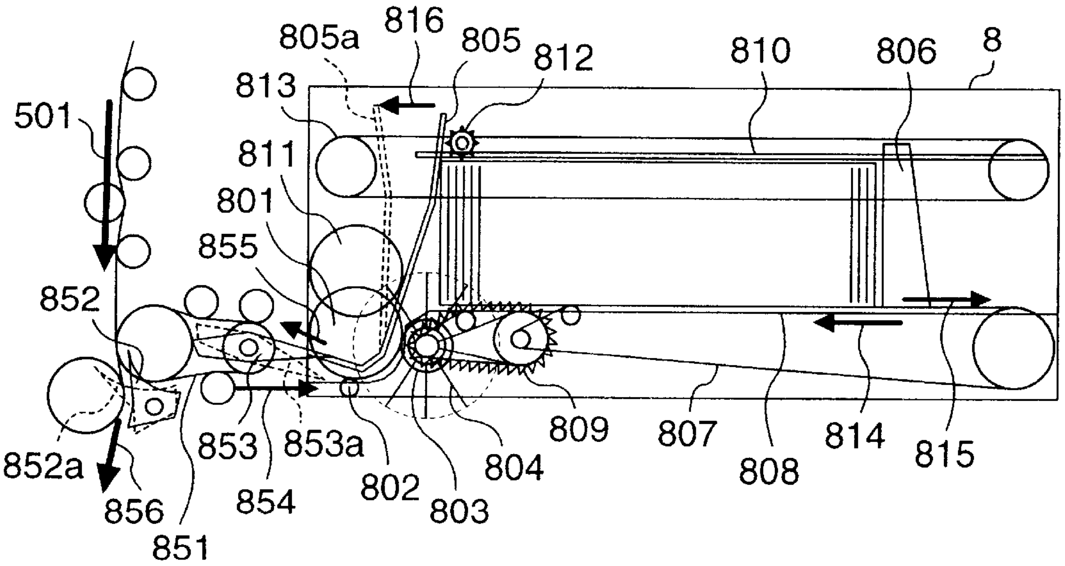
FIG. 8 is a side view of a recycle box in the embodiment of the present invention.

The recycle box 8 is mounted one in number in the present embodiment. The construction of the recycle box 8 is shown in FIG. 8.

The recycle box 8 has both the function of the deposit box 6 of continuously accepting bills and the function of the withdrawal box 7 of continuously delivering bills in a separated manner. Therefore, the recycle box 8 is a bill box which is capable of acceptance and separate delivery. The recycle box 8 constructs a stack/separation mechanism composed of a stack/feed roller 801 and a pickup roller 811 which have the same configuration as the separation mechanism described in conjunction with the withdrawal box 7, a rotating backup roller 802, a gate roller 803 which rotates in a stacking direction and does not rotate in a delivering direction, a brush roller 804 which is disposed on the same axis as the gate roller 803 and includes radially arranged elastic members, and a separation/stack guide 805 which is made movable at the time of separation and at the time of stacking. Bills are accepted in an accepting space enclosed by a bottom plate 808, a push plate 806, a flat bottom face belt 807 suspended so that it supports the lower face of a bill in a plane upper than the bottom plate 808, and the separation/stack guide 805. The recycle box 8 is further provided with a rotating upper scratch roller 812 disposed with a sawtooth-like periphery form in the vicinity of the separation/stack guide 805 in an upper portion of the accepting section, and a rotating lower scratch belt 809 disposed with a sawtooth-like periphery form in the vicinity of the separation/stack guide 805 in a lower portion of the accepting section, so that the sawtooth-like periphery portions support the upper and lower ends of a stacked bill to maintain a standing condition of the bill while scratching the bill on the push plate 806 side.

At the time of separation operation, the separation/stack guide 805 is moved to a position indicated by dotted line 805*a* and the push plate 806 and the bottom face belt 807 are made movable integrally in the accepting space to move the accepted bills so that bills to be delivered impose a predetermined pushing force upon the pickup roller 811 owing to a spring which is not shown. The bills pushed against the pickup roller 811 are delivered by the rotating stack/feed roller 801 and are transported one by one in a direction of arrow 855 while a two-sheet feed is prevented by the gate roller 803 which does not rotate in the delivering direction. Also, a cassette inlet gate 853 of the unit transfer path 851 and a switching gate 852 of the main bill transport path are respectively switched to a direction of broken line 853*a* and a direction of solid line 852 so that the bills are transported in a direction of arrow 856.

At the time of stack operation, the separation/stack guide 805 is moved to a position indicated by solid line and the push plate 806 and the bottom face belt 807 are made movable integrally in the accepting space owing to driving sources (not shown) outside the recycle box to make the controlled movement of the accepted bills in a direction receding from the separation/stack guide 805 so that an entering bill transported in a direction of arrow 854 and the accepted bills do not interfere with the increase in number of accepted bills. At this time, the upper scratch roller 812 and the lower scratch roller 809 make a lefthanded rotation and a righthanded rotation, respectively, so that the sawtooth-like periphery portions support the upper and lower ends of a stacked bill to maintain a standing condition of the bill while scratching the bill on the push plate 806 side.

The reject box 9 has the same construction as the deposit box 6. The load/recovery box 11 has the same construction as the recycle box 8.

Figure 9:
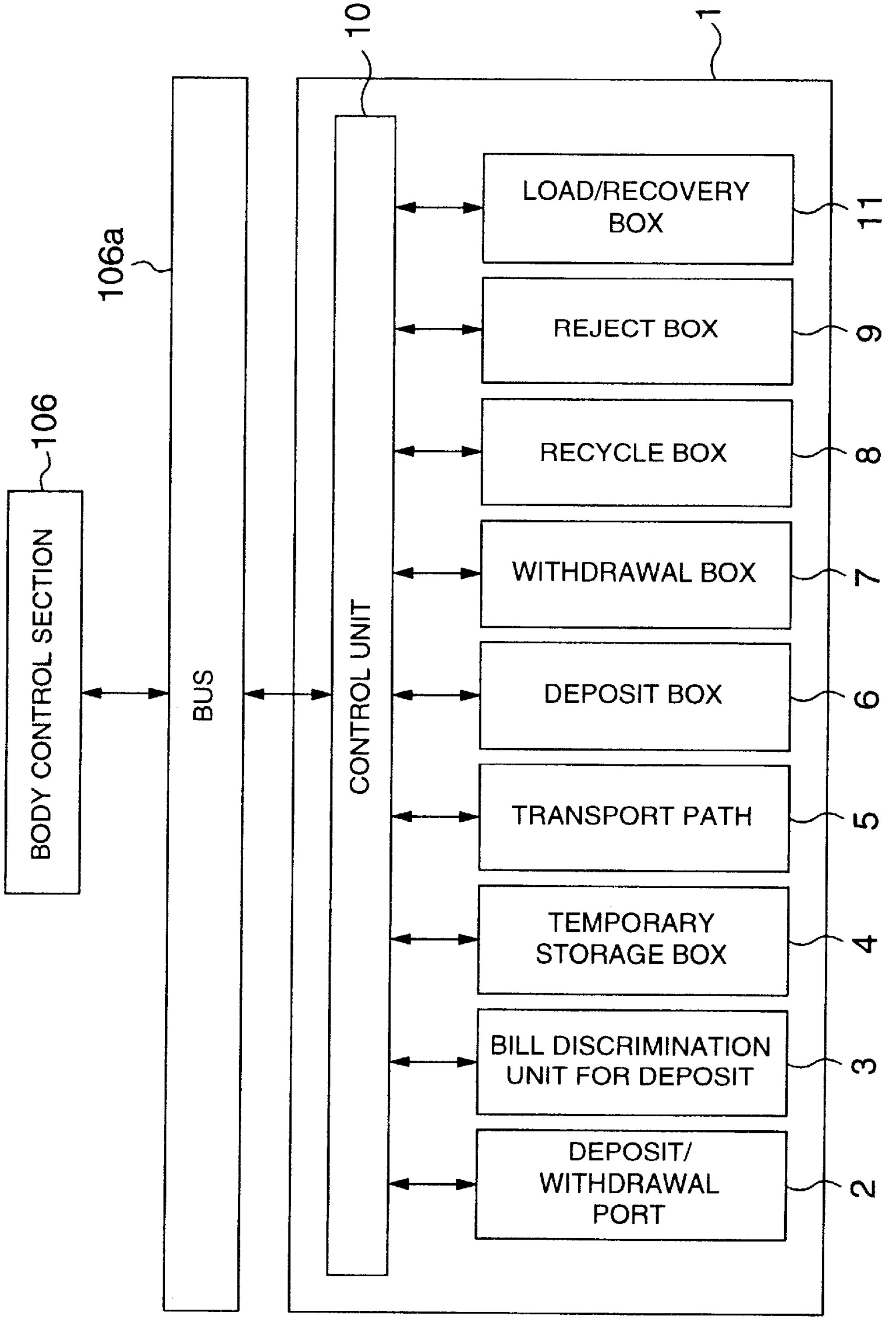
FIG. 9 is a block diagram showing a relation in control of the bill deposit/withdrawal mechanism according to the embodiment of the present invention.

The control unit 10 is connected to the body control section 106 of the machine through the bus 106*a,* as shown in FIG. 9. The control unit 10 performs the control of the bill deposit/withdrawal mechanism 1 in accordance with a command from the body control section 106 and the detection of the state of the bill deposit/withdrawal mechanism 1 and sends the state of the bill deposit/withdrawal mechanism 1 to the body control section 106, as required. The control unit 10 is connected to a driving motor, electromagnetic solenoid or sensor of each unit (the deposit/withdrawal port 2, the bill discriminating unit 3, the temporary storage box 4, the bill transport path 5, the deposit box 6, the withdrawal box 7, the recycle box 8, the reject box 9 and the load/recovery box 11) in the bill deposit/withdrawal mechanism 1 to control the driving of actuators in accordance with transactions while monitoring the states by use of the sensors.

It is preferable that the accepting portion of each unit (the deposit/withdrawal port 2, the deposit box 6, the withdrawal box 7, the recycle box 8, the reject box 9 and the load/recovery box 11) ensures a lateral dimension of about 100 mm and a longitudinal dimension of about 200 mm for the purpose of making it possible to widely handle not only Japanese yen bills but also foreign bills having different dimensions, and the transporting portion (the bill discriminating unit 3, the temporary storage box 4 and the bill transport path 5) ensures a width of about 220 mm. Also, it is preferable that the minimum bill size capable of being handled has a lateral dimension of about 60 mm and a longitudinal dimension of about 120 mm, and the accepting portion such as the deposit box 6, the withdrawal box 7 or the like subjected to the setting of bills by a clerk in charge or a user is provided with an adjustable regulation guide (not shown) in order to regulate the evenness of bills in longitudinal and lateral directions in accordance with the size of the handled bill.

With the provision of a general-purpose ability for the sizes of handled bills, the bill deposit/withdrawal machine of the present embodiment can handle paper sheets other than bills. For example, in the case where tickets or guidebooks are to be issued, the setting of tickets or guidebooks into the withdrawal box 7 by a clerk in charge suffices. In the case where the present machine is to be used as an apparatus which requires the printing as in the issuance of transaction particulars slips, the issuance of checks or the like, a printing mechanism may be provided in the course of the bill transport path or the withdrawal box 7 may be replaced by a dedicated box having an accepting portion, a delivering mechanism and a printing mechanism incorporated therein. In the case where means for reading a paper sheet having a number printed thereon is required as in the issuance of traveller's checks, the reading means may be mounted in a manner similar to the printing means. Alternatively, the paper sheet may be passed through the bill discriminating unit 3 for deposit to read the number printed on the paper sheet so that the paper sheet is then discharged to the deposit/withdrawal port 2.

In the bill deposit/withdrawal mechanism 1 shown in the present embodiment, the units 2 to 11 described in the foregoing are arranged as shown in FIG. 3 and the bill transport path 5 makes the connection between the units by means of the main bill transport path 501 and the unit transport paths 251*a,* 251*b,* 851*a* to 851*e* and 451, thereby materializing each operation such as a deposit transaction, withdrawal transaction or the like.

Next, the operation of the bill deposit/withdrawal machine of the present embodiment will be described.

First, the description will be made of the operation of each transaction, particularly, the flow of bills including rejected bills.

At the time of deposit transaction, bills inputted in the deposit/withdrawal port 2 are separated one by one. The bill joins the main bill transport path 501 through the deposit/withdrawal port unit transport path 251*a* and is subjected to the discrimination of the kind of the bill and the truth or falsehood thereof by the bill discriminating unit 3. Thereafter, the bill is transported along the main bill transport path in a direction from 501*b* to 501*h* and is once accepted into the temporary storage box 4. However, deposit-rejected bills including bills having resulted in the impossibility of discrimination by the bill discriminating unit 3 and bills having abnormal inclination thereof or abnormal interval therebetween branch to the direction of the deposit/withdrawal port 2 through the switching of the switching gate 252 after the departure thereof from the bill discriminating unit 3 and are accepted into the deposit/withdrawal port for return to a user. They are not taken into the temporary storage box 4.

After the materialization of the deposit transaction, the rotary drum 401 of the temporary box 4 is rotated in a direction reverse to that at the time of acceptance. Wound bills are delivered to the main bill transport path 501 in a sequence reverse to that at the time of acceptance so that they are transported in a direction from 501*j* to 501*k* and are then subjected to the discrimination of the kind of the bill and the truth or falsehood thereof by the bill discriminating unit 3 again. Thereafter, one of the switching gates 852*b,* 852*d* and 852*a* of the cassette unit transport paths 851*b,* 851*d* and 851*a* is switched to accept the bill into one of the deposit box 6, the recycle box 8 and the reject box 9.

At the time of withdrawal, bills are delivered out of a bill box for each bill kind in the withdrawal box 7 and the recycle box 8 by predetermined numbers and are subjected to the discrimination by the bill discriminating unit 3 through a route of the main bill transport path 501 from 501*f* to 501*k*. Thereafter, the bills branch at the gate 252 and are accepted into the deposit/withdrawal port 2 so that they are paid to a user. In the case where a withdrawal rejection is generated, the corresponding bills are accepted into the reject box 9 and bills corresponding to the shortage are additionally delivered.

Further, in the case where the user forgets to take out bills in the deposit/withdrawal port 2, the transaction may be discontinued under the judgement of the machine as being abnormal while the bills are left in the deposit/withdrawal port 2 as they are. In the present embodiment, however, the continuation of the succeeding transaction is contemplated by separating the forgotten bills from the deposit/withdrawal port 2, subjecting them to the discrimination in a manner similar to that at the time of deposit transaction and accepting them into the reject box 9.

In the present embodiment, load, recovery and careful-examination operations can be performed for the recycle box 8 by use of the load/recovery box 11.

The load operation is an operation in which a clerk in charge does not set required bills into the recycle box 8 in a manner separated every bill kind but the clerk in charge sets bills en bloc into the load/recovery box 11 and the set bills are accepted into the recycle box 8 automatically in the machine. Bills delivered from the load/recovery box 11 are subjected to the discrimination of the bill type by the bill discriminating unit 3 through a route from 501*h* to 501*k* and are accepted into the recycle box 8 through a route from 501*b* to 501*f.* In the case where a plurality of different recycle boxes for respective bill kinds are provided, the bills are distributed for the respective discriminated bill kinds. Load-rejected bills including bills having resulted in the impossibility of discrimination by the bill discriminating unit 3 and bills having abnormal inclination thereof or abnormal interval therebetween are once accepted into the deposit/withdrawal port 2. After the delivery of all bills from the load/recovery box 11, the load-rejected bills are delivered from the deposit/withdrawal port 2 and are accepted into the load/recovery box 11. Alternatively, they may be accepted as rejected bills into the reject box 9.

The recovery operation is an operation in which for example, when the recycle box 8 becomes full, a clerk in charge does not extract bills individually from the recycle box but bills are automatically accepted from the recycle box 8 into the load/recovery box 11 by a predetermined number. Bills delivered out of the recycle box 8 are once accepted into the temporary storage box 4 and are thereafter delivered from the temporary storage box 4 to the main bill transport path 501 again. Then, the bills are subjected to the discrimination of the number thereof by the bill discriminating unit 3 and are accepted into the load/recovery box 11. In the case where a rejection is generated, the corresponding bill is accepted into the reject box 9.

The careful-examination operation is an operation in which a clerk in charge does not manually count the current amount of bills in the machine by taking out bills in all bill boxes of the reject box 9 but the current amount in the recycle box 8 is automatically counted in the machine, thereby contemplating the saving of clerks in charge. The clerk in charge sets the load/recovery box 11 (or the recycle box 8 having the same structure) of an empty condition into the machine to perform the careful-examination operation. First, all bills delivered out of the recycle box 8 are accepted into the empty load/recovery box 11 and are then delivered from the load/recovery box 11 again. The bills are subjected to the discrimination of the bill kind and the counting of the number of bills by the bill discriminating unit 3 and are accepted into the empty recycle box. After the completion of the operation, the control unit 10 informs the clerk in charge of the current amount of bills in the recycle box by use of output means of the machine.

Figure 10:
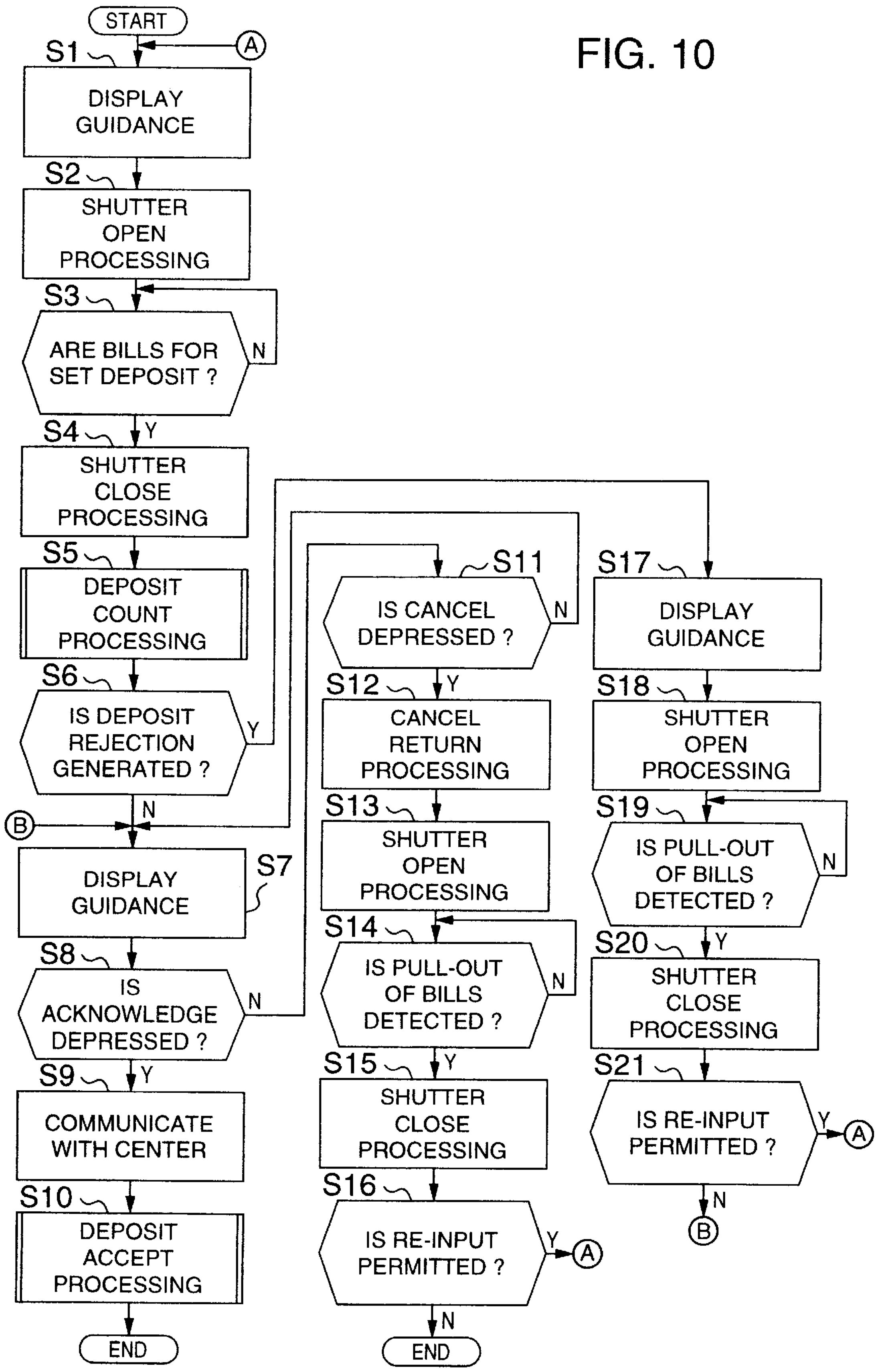
FIG. 10 is a flow chart showing the flow of control at the time of deposit transaction in the embodiment of the present invention.

Next, the flow of the control in the operation of the bill deposit/withdrawal mechanism 1 at the time of deposit transaction will be described in more detail by use of a deposit transaction flow chart shown in FIG. 10.

At the time of deposit transaction, the limited number of bills capable of being inputted and so forth are displayed on the customer operation section 105 in a guidance displaying step S1. For example, a guidance such as "BILLS UP TO 200 SHEETS PER ONE DEPOSIT CAN BE TRANSACTED" may be displayed. Next, the shutter 201 is opened through a shutter open processing (step S2) and a wait is taken for bills for deposit to be set into the deposit/withdrawal port 2 (step S3). When the bills are inputted into the deposit/withdrawal port 2, the shutter 201 is closed through a shutter close processing (step S4) and a deposit count processing (step S5) for counting the deposited bills is performed.

In step S5, the bills inputted in the deposit/withdrawal port 2 are transported to the deposit bill discriminating unit 3 through the deposit unit transport path 251*a* in a form separated one by one to perform the discrimination of the bill as to the truth or falsehood thereof and so forth. Bills discriminated by the deposit bill discriminating unit 3 as being ones capable of deposit are transported on the main transport paths 501*a* to 501*h* and are then accepted into the temporary storage box 4 once through the control of the switching gate 542.

In the case where a deposit rejection is generated due to the impossibility of discrimination by the deposit bill discriminating unit 3 or abnormal inclination or abnormal interval between bills (step S6: Y), the bills are accepted into the deposit/withdrawal port 2 through the switching of the switching gate 252 while a guidance informing a user of the deposit rejection is displayed on the customer operation section 105 (step S17). A shutter open processing (step S18) is performed. After the pull-out of bills is confirmed in step S19, a shutter close processing (step S20) is performed. Thus, the deposit-rejected bills are returned to the user.

As the guidance in step S17 may be displayed a guidance such as "XX SHEETS IN THE FRONT AND XX SHEETS IN THE REAR ARE ABNORMAL BILLS" in order that the user can know which of bills returned to the deposit/withdrawal port 2 could not be taken in. Also, in the case where bills are rejected due to the inferiority of the state of bills set into the deposit/withdrawal port 2 resulting in the inferiority of the state of transport, a guidance of "PLEASE SET AGAIN" can be displayed. In the case where inputted bills are of a bill kind incapable of being handled, a guidance such as "INPUTTED BILLS ARE ONES INCAPABLE OF BEING HANDLED" can be displayed.

After the return of the deposit-rejected bills, step S21 is carried out. In the case where the deposit count processing is accepted again, the flow returns to the guidance processing in step S1. In the case where the deposit count processing is not accepted, the flow proceeds to a guidance processing in step S7.

In the case where the deposit rejection is not generated in step S6, a guidance including the number of bills counted in the deposit count processing (step S5) is displayed on the customer operation section 105 (step S7). When the user's confirmation acknowledging the amount of deposit is made in step S8, a center communication (step S9) is made. The deposit transaction is materialized and a deposit accept processing (step S10) is performed, thereby completing the deposit transaction.

In the deposit accept processing (step 10), the rotary drum 401 of the temporary storage box 4 is rotated in a direction reverse to that at the time of deposit count so that bills wound around the rotary drum 4 are delivered to the main bill transport path 501*j* in a sequence reverse to that at the time of acceptance into the temporary storage box 4. The bills are subjected to the discrimination of bill kind information by the bill discriminating unit 3 again and are subjected to a processing in which they are accepted into one of the deposit box 6, the recycle box 8 and the reject box 9.

In the case where the user does not select the acknowledgement in step S8 and selects the cancel of deposit in step S11, the push plate 203 of the deposit/withdrawal port 2 is moved and the rotary drum 401 of the temporary storage box 4 is reversely rotated, thereby performing a cancel return processing (step S12) in which bills wound on the rotary drum 401 are transported to the deposit/withdrawal port 2 through the main bill transport paths 501*j*, 501*k* and 501*a*. Thereafter, a shutter open processing (step S13) is performed. After the pull-out of bills is confirmed in step S14, a shutter close processing (step S15) is performed. Thus, the deposited bills are returned to the user. In the case where the re-input is permitted in step S16, the flow returns to the guidance displaying step S1. In the case where the re-input is not permitted, the deposit transaction is completed.

Next, the deposit count processing (step S5) will be described in more detail.

Figure 11:
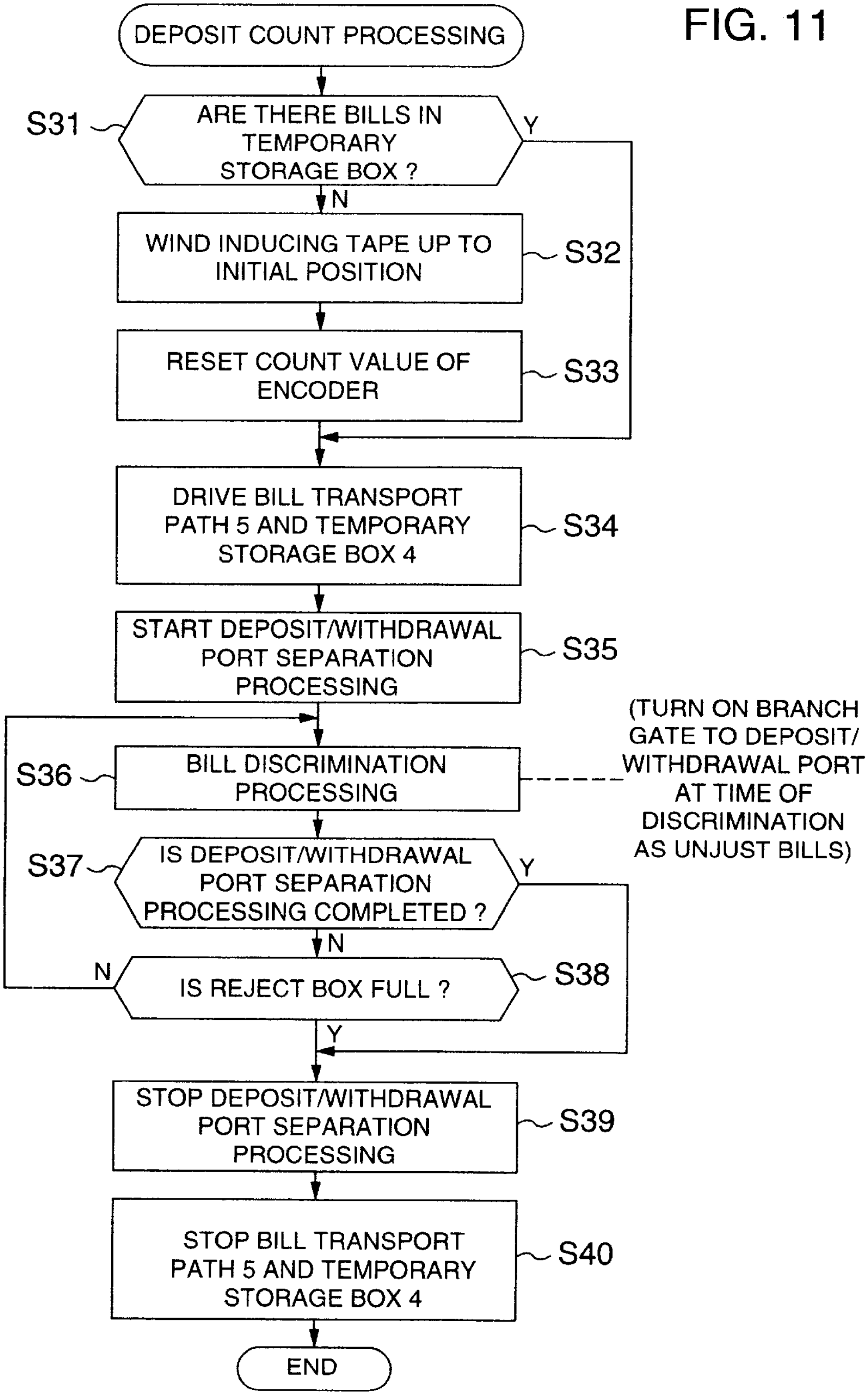
FIG. 11 is a detailed flow chart of a deposit count processing in the embodiment of the present invention.

FIG. 11 is a detailed flow chart of the deposit count processing. First, the judgement is made of whether or not there are deposited bills in the temporary storage box 4. If there are not deposited bills (step S31: N), the corresponding case is regarded as being the time of a first deposit count. At this time, the inducing tape is wound up to an initial position (step S32) and the count value of the encoder is reset (step S33). Thereafter, the bill transport path 5 and the temporary storage box 4 are driven (step S34). If there are deposited bills (step S31: Y), the corresponding case is a second deposit count resulting from the re-input of deposit-rejected bills and hence the bill transport path 5 and the temporary storage box 4 are immediately driven (step S34). After the bill transport path 5 is driven, a deposit/withdrawal port separation processing (step S35) is started so that bills separated from the deposit/withdrawal port 2 are discriminated by the bill discriminating unit 3 (step S36). In the case where the discrimination as being unjust bills is made, the switching gate 252 for the deposit/withdrawal port is switched to the deposit/withdrawal port side.

Before the deposit/withdrawal port separation processing for all bills in the deposit/withdrawal port is completed (step S37: N), the processings in steps S36 and S37 are repeatedly continued until the reject box becomes full. When the reject box becomes full, the deposit/withdrawal port separation processing is stopped in step S39. When the deposit/withdrawal port separation processing for all bills is completed (step S37: Y), the deposit/withdrawal port separation processing is stopped (step S39). After the deposit/withdrawal port separation processing is stopped in step S39, the driving of the bill transport path 5 and the temporary storage box 4 is stopped (step S40).

Next, the deposit accept processing will be described.

Figure 12:
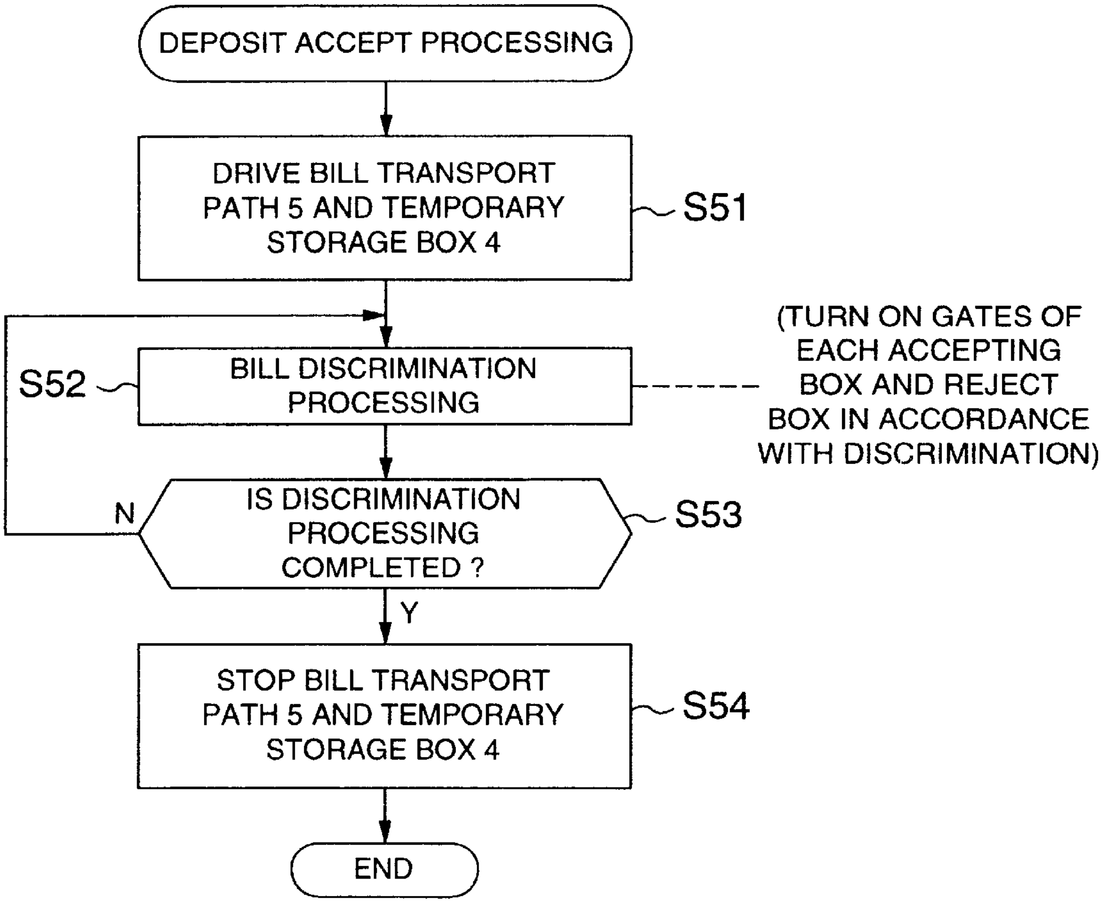
FIG. 12 is a detailed flow chart of a deposit accept processing in the embodiment of the present invention.

FIG. 12 is a flow chart of the deposit accept processing (step S10 in FIG. 10) in which acceptable bills are accepted. First, the bill transport path 5 and the temporary storage box 4 are driven (step S51) so that all bills stored in the temporary storage box 4 are passed through the bill discriminating unit 3 to discriminate the bill kind and so forth (steps S52 and S53). In accordance with the result of discrimination, the gates of each accepting box and the reject box are controlled. When the discrimination processing for all bills stored in the temporary storage box 4 is completed (step S53: Y), the driving of the bill transport path 5 and the temporary storage box 4 is stopped (step S54).

In the bill deposit/withdrawal mechanism 1 of the present embodiment as mentioned above, the units including the deposit/withdrawal port 2, the bill discriminating unit 3, the temporary storage box 4, the bill transport path 5, the deposit box 6, the withdrawal box 7, the recycle box 8, the reject box 9 and the load/recovery box 11 are connected by the bill transport path 5 including the main bill transport path 501 (501*a* to 501*k*) and the unit transport paths 251*a*, 251*b*, 851*a* to 851*e* and 451, whereby not only each transaction such as a deposit transaction, withdrawal transaction or the like is materialized but also the whole of the machine provides effects concerning the reduction in size, the simplification, the improvement on reliability, the improvement on operability, the general-purpose ability and so forth, as will be mentioned in the following.

Figure 19:
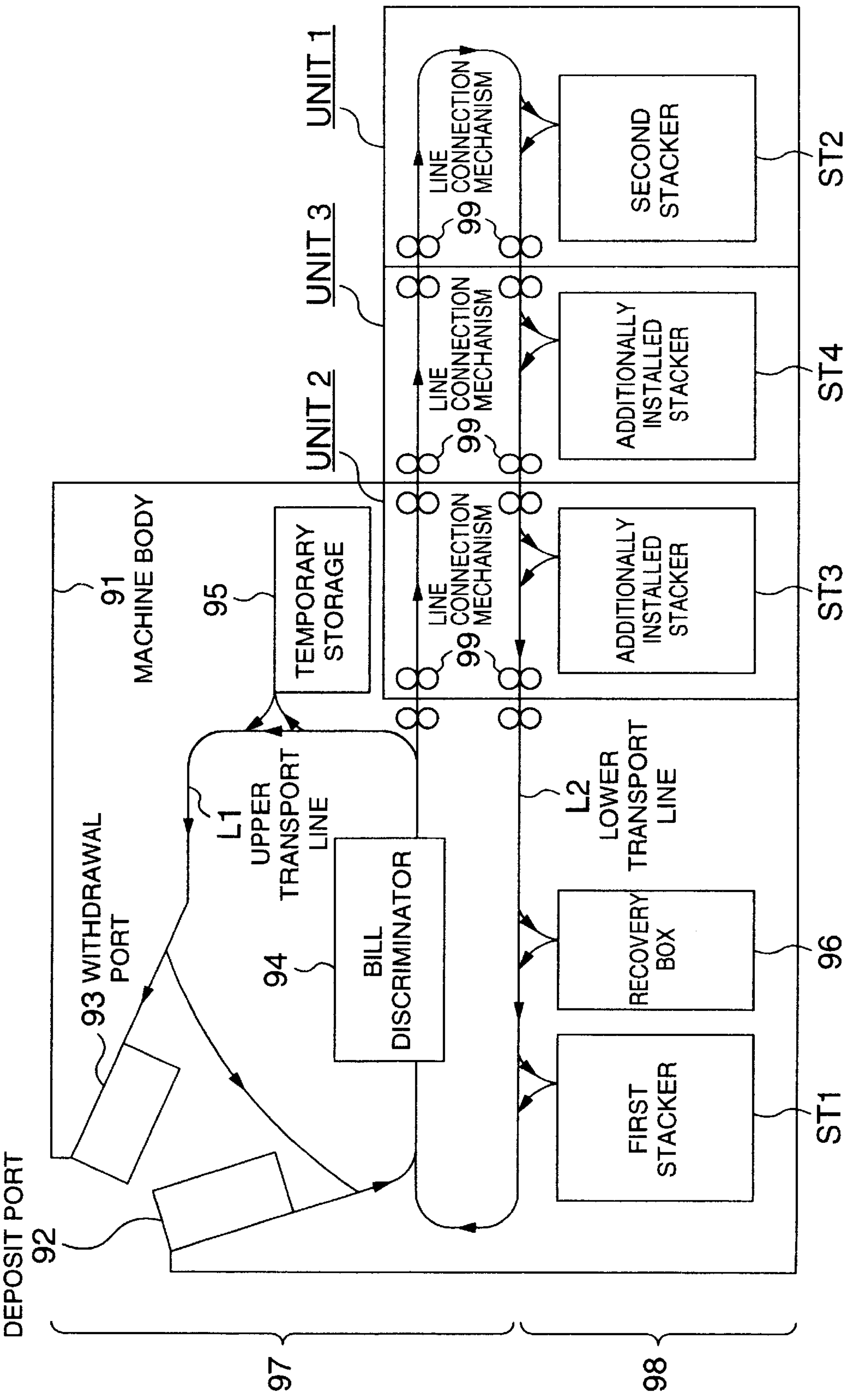
FIG. 19 is a diagram showing the route construction of a bill transport path in the prior art.

Firstly, in the present embodiment, since the main bill transport path 5 making a ring-like and one-directional transport while passing through the bill discriminating unit 3 is formed so that bills delivered individually from the deposit/withdrawal port 2, the temporary storage box 4, the withdrawal box 7, the recycle box 8 and the load/recovery box 11 individually join the main bill transport path 501 whereas bills to be accepted individually into the deposit/withdrawal port 2, the temporary storage box 4, the deposit box 6, the recycle box 8, the reject box 9 and the load/recovery box 11 individually branch from the main bill transport path 501, there can be realized a machine which has a small size and a little branch/joint, for example, as compared with the conventional bill deposit/withdrawal machine, as shown in FIG. 19, in which two ring-like main bill transport paths are configured into a character "8" form. Especially, in order to remove staying bills in the case where a bill jam is generated, it is required that a transport path has a structure with which the path can be opened and closed. In connection with this point too, the present embodiment can realize a machine having a reduced opening and closing mechanism for jam removal. Accordingly, not only the reduction in size is attained but also the improvement on operability is provided in connection with an operation performed by a clerk in charge.

Further, in the present embodiment, a branch point to the deposit/withdrawal port 2, a branch point to the reject box 9, a branch point to the deposit box 6, a confluent point from the withdrawal box 7, branch/confluent points for the recycle box 8, branch/confluent points for the load/recovery box 11, branch/confluent points for the temporary storage box 4, and a confluent point from the deposit/withdrawal port 2 are arranged, for the ring-like and one-directional main bill transport path 501, in the mentioned order in the direction of downstream from the bill discriminating unit 3. With this order of arrangement, all bills transported in a deposit transaction, withdrawal transaction or the like are passed through the bill discriminating unit 3, as mentioned above, thereby realizing effective transport and strict cash management. In other words, the above-mentioned order of arrangement is effective for realizing such effective transport and strict cash management by not the character "8"-configured main bill transport path in the prior art but one ring-like main bill transport path 501 in the present embodiment. For example, the arrangement of the temporary storage box at the last on the single ring-like main transport path makes possible to perform the discrimination of bills both at the time of deposit count processing and at the time of deposit accept processing. Also, the arrangement of the reject box at the lead makes it possible to reduce the length of transport of rejected bills, for example, at the time of deposit acceptance, at the time of withdrawal or at the time of loading.

Secondly, in the present embodiment, those ones of bills delivered from the deposit/withdrawal port 2 in a deposit transaction having the possibility of input of bills with various conditions which are transported in greatly inclined states, folded or broken, are regarded by the bill discriminating unit 3 as being bills to be subjected to deposit rejection so that they are not taken into the temporary storage box 4 and are thereinstead discharged to the deposit/withdrawal port 2 for return to a user by switching the switching gate 252. A bill transport path for travel of the deposit-rejected bills at this time has only one confluent point on a route of the bill transport path from the deposit/withdrawal port 2 to the bill discriminating unit 3 and only one branch point on a route of the bill transport path from the bill discriminating unit 3 to the deposit/withdrawal port 2. Namely, the number of included branch/confluent points is small and the transport or travel distance is short, as compared with the prior art shown in FIG. 19. In a deposit transaction, a user inputs bills on hand with no deliberation. Accordingly, the input of folded or broken bills, the loading of an alien such as hard money, and so forth may be supposed. In the deposit transaction, therefore, bills to be returned as deposit rejection are liable to encounter a bill jam at a branch point or confluent point in the course of transport. With the present embodiment, the possibility of such bill jam can be reduced. Also, even if a bill jam is generated, the jam position is limited. Therefore, the number of locations to be subjected to the confirmation of bill stay on the transport path at the time of jam removal is reduced, thereby making it possible to attain the saving of operation by a clerk in charge.

Thirdly, in the present embodiment, the bill discriminating unit 3 is arranged under the deposit/withdrawal port 2 and the temporary storage box 4 is arranged under the bill discriminating unit 3 whereas accepting boxes including the deposit box 6, the withdrawal box 7, the recycle box 8, the reject box 9 and the load/recovery box 11 are arranged in a stack-layered manner at the rear portion. Especially, each accepting box arranged at the rear portion is provided with the same outside dimension to make that box detachable from the bill deposit/withdrawal mechanism 1 and the cassette unit transport paths 851*a* to 851*e* are constructed commonly and divisionally. Accordingly, there is provided a general-purpose construction in which the change in setting of the total number of the deposit box 6, the withdrawal box 7, the recycle box 8, the reject box 9 and the load/recovery box 11 and the change in setting of an allocation number for each box are easy. Also, the operation by a user from the rear face is facilitated.

For example, in the case where the deposit/withdrawal is to be made, the bank side may rather select the recycle box 8 in the aspect of financial efficiency than provide the deposit box 6 and the withdrawal box 7 particularly, or may select the particular provision of the deposit box 6 and the withdrawal box 7 since the circulating situation of bills causes the recycle to involve problems including the risk of counterfeit bills and the risk of a jam owing to broken bills.

In the case where two or more recycle boxes 8 are mounted, a construction provided with the load/recovery box 11 may be selected for the saving of processing by a clerk in charge or a construction provided with no load/recovery box 11 may be selected in the aspect of cost or because of the risk of a jam owing to the breakage of bills attendant upon the increase of the bill transport frequency in the machine.

The bank side can operate the machine in a manner that at the initial stage of installation, the machine is operated with the construction shown in FIG. 3 and in accordance with the operating state of deposit/withdrawal transactions, for example, in the case where the frequency of the withdrawal transaction is higher than that of the deposit transaction and hence the increase in number of the withdrawal box is desired, deposited bills are accepted into not the deposit box 6 but the reject box 9 while the deposit box 6 is replaced by the withdrawal box 7. Otherwise, the operation of the machine may be changed in accordance with the operating state of transactions, for example, between a weekday and a holiday. For example, when the recycle box 8 and the withdrawal box 7 in the present embodiment are compared, the bill capability of the recycle box 8 is small since a space for an accepting operation is ensured at the front of an accepting portion. Therefore, on a holiday when a large number of withdrawal transactions are supposed, the operation with the recycle box 8 replaced by the withdrawal box 7 may be performed.

It is of course that the machine in the present embodiment can be used as a deposit machine for handling only deposit or a withdrawal machine for handling only withdrawal. Especially, in the case where there is used as a withdrawal machine, it is advantageous in the aspect of cost that a construction without the bill discriminating unit 3 and the temporary storage box 4 is employed.

In the case where when the deposit box 6, the withdrawal box 7, the recycle box 8, the reject box 9 and the load/recovery box 11 are to be changed in total number, the total number is increased as compared with that in the present embodiment, the dimension of height of the bill deposit/withdrawal mechanism 1 may be increased for the additional stack-layering of bill boxes. In the case where the total number is decreased as compared with that in the present embodiment, the machine may be operated with unnecessary portions left as they are idle or the dimension of height of the bill deposit/withdrawal mechanism 1 may be decreased for the reduction in size.

The deposit box 6, the withdrawal box 7, the recycle box 8, the reject box 9 and the load/recovery box 11 have such compatibility as mentioned above. Namely, the deposit box 6 and the reject box 9 are compatible with each other and the recycle box 8 and the load/recovery box 11 are compatible with each other. Also, in the case where a plurality of withdrawal boxes 7 are mounted, they are compatible with each other. Therefore, a display unit and storage means may be provided for each bill box to display and store the distinction of bill box, the distinction of bill kind, the number of accepted bills and so forth, thereby making it possible to contemplate the improvement on handling, the prevention of erroneous attachment/detachment and the improvement on strictness of cash management.

Further, the present embodiment is equipped with a general-purpose ability for bills to be handled. For the purpose of making it possible to widely handle not only Japanese yen bills but also foreign bills having different dimensions, it is preferable that the accepting portion of each unit (the deposit/withdrawal port 2, the deposit box 6, the withdrawal box 7, the recycle box 8, the reject box 9 and the load/recovery box 11) ensures a lateral dimension of about 100 mm and a longitudinal dimension of about 200 mm and the transporting portion (the bill discriminating unit 3, the temporary storage box 4 and the bill transport path 5) ensures a width of about 220 mm. Also, it is preferable that the minimum bill size capable of being handled has a lateral dimension of about 60 mm and a longitudinal dimension of about 120 mm and the accepting portion such as the deposit box 6, the withdrawal box 7 or the like subjected to the setting of bills by a clerk in charge or a user is provided with an adjustable regulation guide (not shown) in order to regulate the evenness of bills in longitudinal and lateral directions in accordance with the size of the handled bill.

In the recycle box 8, bills are discharged from the lower part to the upper part at the time of acceptance and discharged to the lower part at the time of delivery and the accepted bills are stacked in a horizontal direction, as mentioned above. Even if bills having different dimensions, particularly, bills having different dimensions in a lateral direction corresponding to the direction of transport are included in the recycle box, a lower end of the bill is aligned along the bottom plate 808 due to the gravitational force of the bill at the time of acceptance and hence the head of the bill is registered at the time of delivery. Therefore, it is easy to ensure a stabilized delivery ability.

Also, with the handling of foreign bills too, not only the number of bill kinds increases as compared with the case of Japanese yen bills but also in many cases, the sizes of bills are greatly different in both the lateral and longitudinal directions in accordance with the kinds of bills, thereby yielding a possibility that the evenness of bills inputted into the deposit/withdrawal port is largely disturbed. Further, the conditions of many foreign bills including the degrees of fold and breaking thereof are deteriorated as compared with those of Japanese yen bills when the judgement is made from the circulating situation of bills in each country. Accordingly, the reduction of a bill jam generated on the bill transport path owing to the deposit-rejected bills generated at the time of deposit transaction is an important problem. In the present embodiment, a bill transport path for travel of deposit-rejected bills has only one confluent point on a route of the bill transport path from the deposit/withdrawal port 2 to the bill discriminating unit 3 and only one branch point on a route of the bill transport path from the bill discriminating unit 3 to the deposit/withdrawal port 2, as mentioned above. Namely, the number of included branch/confluent points is small. Also, since the deposit/withdrawal port 2 is arranged above the bill discriminating unit 3, the transport or travel distance is short. With such construction in the present embodiment, it is possible to attain the reduction of a bill jam.

Also, with the provision of a general-purpose ability for the sizes of handled bills, the bill deposit/withdrawal mechanism of the present embodiment can handle paper sheets other than bills. For example, in the case where tickets or guidebooks are to be issued, the setting of tickets or guidebooks into the withdrawal box 7 by a clerk in charge suffices. In the case where the machine is to be used as an apparatus which requires the printing as in the issuance of transaction particulars slips, the issuance of checks or the like, a printing mechanism may be provided in the course of the bill transport path or the withdrawal box 7 may be replaced by a dedicated box having an accepting portion, a delivering mechanism and a printing mechanism incorporated therein. In the case where means for reading a paper sheet having a number printed thereon is required as in the issuance of traveller's checks, the reading means may be mounted in a manner similar to the printing means. Alternatively, the paper sheet may be passed through the bill discriminating unit 3 for deposit to read the number printed on the paper sheet so that the paper sheet is then discharged to the deposit/withdrawal port 2.

Also, in the present embodiment, the deposit box 6, the withdrawal box 7, the recycle box 8 and the reject box 9 generally operated by a clerk are arranged in a stack-layered manner on the rear face side of the machine. Therefore, it is possible to get out each bill box (or accepting box) individually and horizontally from the rear face, which provides an improved operability. Though an abnormality such as a jam is liable to generate between those bill boxes and the cassette unit transport paths 851*a* to 851*e*, the bill box is easily detachable and hence a jam removing operation is facilitated. In the case where bills are to be taken out of a bill box or to be added into a bill box, it is not necessary to stop the machine since the removal of the corresponding box does not hinder the continuation of a transaction in which the corresponding box is not used.

Further, in the construction of the present embodiment, each unit (the deposit/withdrawal port 2, the bill discriminating unit 3, the temporary storage box 4, the deposit box 6, the withdrawal box 7, the recycle box 8, the reject box 9 and the load/recovery box 11) is independently provided, as mentioned above, and the bill transport path 5 connects those units. Therefore, the handling including assemblability and transportability is facilitated. In the above-mentioned embodiment, the temporary storage box has a bill winding type of construction, as shown in FIG. 5. However, a general bill stacking type of stacker may be used. Also, though the deposit/withdrawal port is constructed as one unit, a deposit port for inputting bills for deposit therein and a withdrawal port for discharging bills for withdrawal thereto may be provided independently of each other.

Next, description will be made of examples in which the selection in type and number of each accepting box and the handling of a variety of bills are possible.

Referring to FIG. 3, there is employed a construction in which the bill discriminating unit 3 is arranged under the deposit/withdrawal port 2, the temporary storage box 4 is arranged under the bill discriminating unit 3, and the accepting boxes including the deposit box 6, the withdrawal box 7, the recycle box 8, the reject box 9 and the load/recovery box 11 are stack-layered in a vertical direction, thereby making it possible to selectively increase or decrease the number of the accepting boxes, as required. At this time, the deposit/withdrawal port 2, the bill discriminating unit 3, the temporary storage box 4 and the bill transport path 501 are arranged at positions different from an upper space in the vertical direction in which the accepting boxes are stack-layered. For example, the former units are arranged at the front portion and the latter units are arranged at the rear portion. Also, especially, each accepting box arranged at the rear portion is provided with the same outside dimension and is detachable from the bill deposit/withdrawal mechanism 1, the cassette unit transport paths 851*a* to 851*e* are constructed commonly and divisionally, and a U-turn portion of the main bill transport path 501 between arrows 501*b* and 501*c* or the U-turn bill transport path 860 is detachable from the main bill transport path 501. Accordingly, there is provided a general-purpose construction in which the change in setting of the total number of the deposit box 6, the withdrawal box 7, the recycle box 8, the reject box 9 and the load/recovery box 11 and the change in setting of an allocation number for each box are easy.

Figure 13:
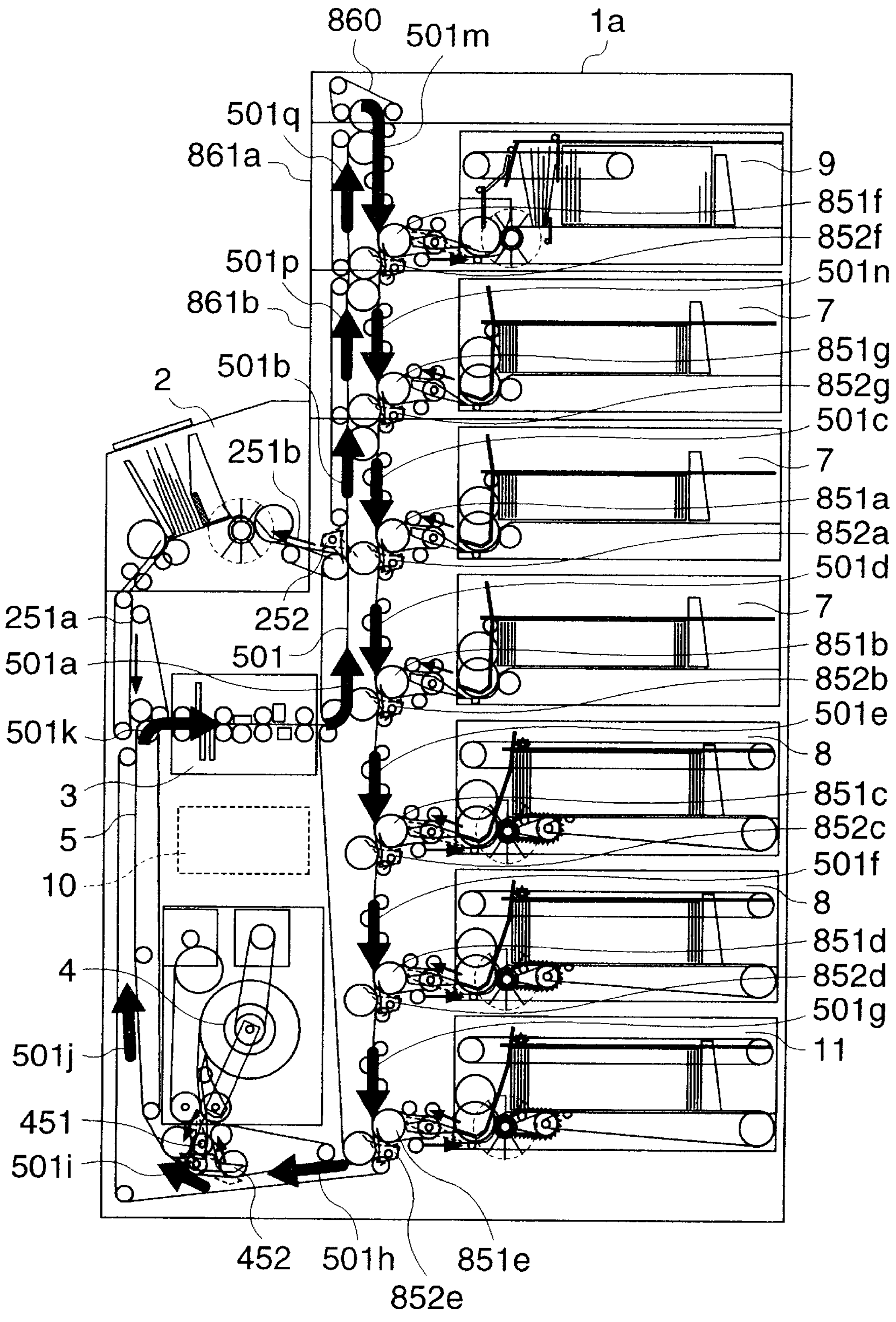
FIG. 13 is a side view showing a second embodiment of the present invention.

As an example in the case where the total number of accepting boxes is increased, FIG. 13 shows an embodiment in the case where the total number of accepting boxes is set to 7. The present embodiment is based on the first embodiment shown in FIG. 3. More particularly, it is constructed by removing the U-turn bill transport path 860, stack-layering additional accepting boxes 861*a* and 861*b* at the rear portion, and mounting the U-turn bill transport path 860 above the additional accepting box 861*a*. The additional accepting box 861*a* includes a cassette unit transport path 851*f* and a bill transport path (arrows 501*q* and 501*m*) which forms the main bill transport path 501. The additional accepting box 861*b* has the same construction as the additional accepting box 861*a*. A deposit/withdrawal port 2, a bill discriminating unit 3 and a temporary storage box 4 at the front portion are common to the first embodiment in construction. A bill transport path 5 is based on the first embodiment or forms a ring-like main bill transport path 501 added with a main bill transport path 501 indicated by arrows 501*p*, 501*q*, 501*m* and 501*n*.

In the case where a bill deposit/withdrawal mechanism 1*a* shown in FIG. 13 is equipped or mounted in an automated teller machine, the increase in height dimension of the rear portion as compared with the bill deposit/withdrawal mechanism 1 shown in FIG. 3 suffices. In an automated teller machine as shown in FIG. 1, there is a space in an upper portion of the bill deposit/withdrawal mechanism 1 so that accepting boxes can be extended in number up to 8 at the largest. According to the present embodiment, even if accepting boxes are additionally provided or installed, the mounting space is increased only upward. Namely, the increase in floor area is not required in contrast with the case where the accepting boxes are additionally installed at the rear portion of such conventional machine as shown in FIG. 19. This is advantageous in the case where a large restriction is imposed upon an installation floor area as in an automated-machine corner of a banking organ. Also, the position of the deposit/withdrawal port arranged at the front portion is the same and hence the user's operability does not change at all. In the case where the total number of accepting boxes is made smaller than 5 in FIG. 3, a construction with an unnecessary accepting box not mounted suffices but the cost can be reduced corresponding to parts (cassette unit transport path 851 and so forth) which become unnecessary.

With such a construction in which the selection in type and number of each accepting box and the handling of a variety of bills are possible, a variety of settings are possible as an automated teller machine in operational aspects including the kinds of handled bills, the number of bill kinds, the contents of transactions, and so forth. For example, in the case where the deposit/withdrawal is to be made, the bank side may rather select the recycle box 8 in the aspect of financial efficiency than provide the deposit box 6 and the withdrawal box 7 particularly, or may select the particular provision of the deposit box 6 and the withdrawal box 7 since the circulating situation of bills causes the recycle to involve problems including the risk of counterfeit bills and the risk of a jam owing to broken bills.

In the case where two or more recycle boxes 8 are mounted, a construction provided with the load/recovery box 11 may be selected for the saving of processing by a clerk in charge or a construction provided with no load/recovery box 11 may be selected in the aspect of cost or because of the risk of a jam owing to the breakage of bills attendant upon the increase of the bill transport frequency in the machine.

The bank side can operate the machine in a manner that at the initial stage of installation, the machine is operated with the construction shown in FIG. 3 and in accordance with the operating state of deposit/withdrawal transactions, for example, in the case where the frequency of the withdrawal transaction is higher than that of the deposit transaction and hence the increase in number of the withdrawal box is desired, deposited bills are accepted into not the deposit box 6 but the reject box 9 while the deposit box 6 is replaced by the withdrawal box 7. Otherwise, the operation of the machine may be changed in accordance with the operating state of transactions, for example, between a weekday and a holiday. For example, when the recycle box 8 and the withdrawal box 7 in the embodiment are compared, the bill capability of the recycle box 8 is small since a space for an accepting operation is ensured at the front of an accepting portion. Therefore, on a holiday when a large number of withdrawal transactions are supposed, the operation with the recycle box 8 replaced by the withdrawal box 7 may be performed. Also, it is of course that the machine in the embodiment can be used as a deposit machine for handling only deposit or a withdrawal machine for handling only withdrawal. Especially, in the case where there is used as a withdrawal machine, it is advantageous in the aspect of cost that a construction without the bill discriminating unit 3 and the temporary storage box 4 is employed.

Further, such a bill deposit/withdrawal machine as shown in FIG. 13 which has seven accepting boxes, can cope with a withdrawal transaction of six kinds of bills by virtue of six accepting boxes in total including three withdrawal boxes 7 and three recycle boxes 8 (inclusive of one recycle box 8 by which the load/recovery box 11 is replaced) and is optimum for countries such as countries in Europe and America or countries in Southeast Asia where many kinds of bills are circulated. In Japanese territory too, the machine may be operated as a bill deposit/withdrawal machine capable of handling six kinds of bills in total which include not only three kinds of Japanese yen bills composed of 1,000 yen, 5,000 yen and 10,000 yen but also, for example, three kinds of U.S. dollar bills composed of $1, $10 and $100. In order to thus increase the number of bill kinds to be handled, not only the increase in number of accepting boxes is required but also in the second embodiment, those ones of bills delivered from the withdrawal box and the recycle box which are not used for withdrawal and those ones of deposited bills which are not accepted into the recycle box may be accepted in the reject box 9 to make the number in kind of bills for withdrawal large while no deposit box 6 is provided instead of providing the deposit box 6 and the reject box 9 separately as in the first embodiment shown in FIG. 3.

With no load/withdrawal box 11 provided, a clerk in charge can make the attachment/detachment every accepting box to perform the supplement and recovery of bills through manual setting. It is of course that in the second embodiment too, the operation with the combination of accepting boxes changed as mentioned above may be performed. Further, though the reject box 9 is indispensable for accepting those ones of bills delivered at the time of withdrawal transaction from the withdrawal box 7 and the recycle box 8 which are not used for withdrawal, the arranging position of the reject box 9 is most effective when in any case of the embodiments shown in FIGS. 3 and 13, it is set at the uppermost stage, that is, the mounting position of the first accepting box in the downstream direction of the main bill transport path 501 from the bill discriminating unit 3, since a delivering operation is not stopped in the case where rejection is generated at the time of withdrawal operation.

In the case where the types of accepting boxes and/or the number of boxes for each type are not fixed or are made variable as required, as mentioned above, there is caused a need to change operation contents in accordance with the change in type and/or number. In this case, an operation content setting method mentioned in the following is most effective. Next, specific description will be made of a method of setting the contents of the operation of an automated teller machine using the bill deposit/withdrawal mechanism according to the present embodiment.

Figure 14:
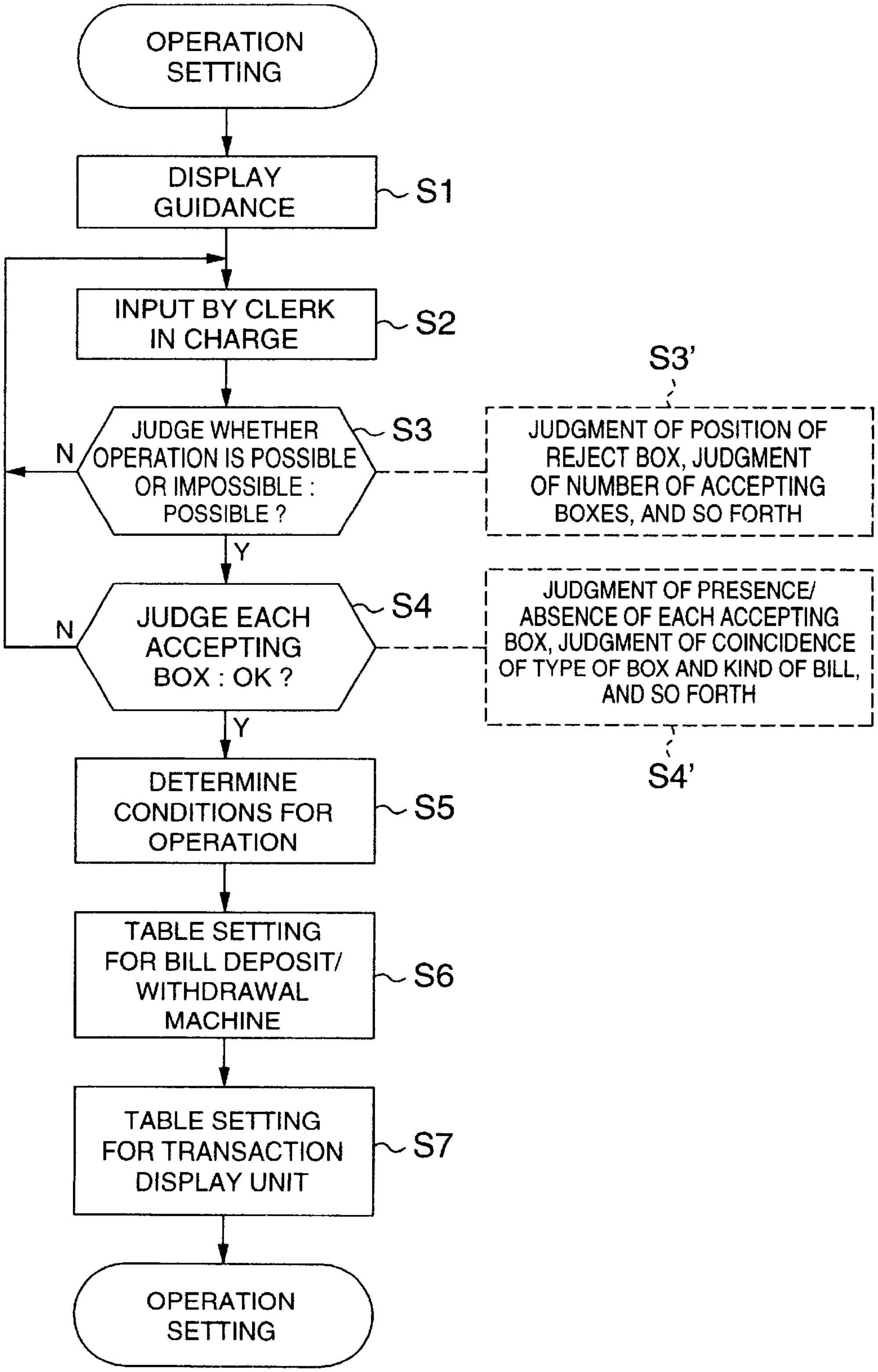
FIG. 14 is a flow chart showing an operation condition setting method in the embodiment of the present invention.

FIG. 14 is a flow chart for the setting of operation contents. The setting of the contents of the operation of the automated teller machine is made through the input from a clerk in charge by the clerk-in-charge operation section 106*c* provided on a rear door which is not shown in FIG. 1. When operation setting is started, there is first outputted a guidance display (step S1) an example of which is shown in FIG. 15. If it is assumed that the bill deposit/withdrawal machine in the present example includes accepting boxes 1 to 5, the clerk in charge inputs the type of accepting box and the kind of bill, for example, the types such as REJECT BOX, DEPOSIT BOX, WITHDRAWAL BOX, RECYCLE BOX, and so forth and the bill kinds such as U.S. $ ALL KINDS, U.S. $10 and so forth, as shown in FIG. 15, into TYPE and KIND OF BILL columns for ones 1 to 5 of accepting boxes 1 to 8 through selective key input (step S2).

On the basis of the result of input, the judgement is made of preset restriction conditions stored in the control unit 10 or 106 are satisfied, for example, whether or not the reject box is set to a prescribed position (for example, a leading accepting box 1), whether or not the required number of accepting boxes is set, whether or not bill kinds are sufficient upon operation, and so forth (step S3). Next, on the basis of information from an accepting box presence/absence detecting sensor, an accepting box type judging sensor and an accepting box remaining amount detecting sensor (not shown in FIG. 3), the judgement is made of whether or not prescribed type accepting boxes are set to the prescribed positions, whether or not kind of bills accepted in each accepting box coincides with each of the prescribed kinds of bills and whether or not remaining amount of bills in each accepting box exceeds the predetermined amount of bills (step S4). In the case where it is determined as the result of judgement that the operation is possible, the conditions for operation are determined (step S5). In the case where the operation is impossible, the input by the clerk in charge is done again (step S2). The accepting box type judging sensor is constructed in such a manner that each accepting box is provided with means for setting or storing the type and bill kind of that accepting box and the sensor detects or read information from the setting or storing means. The input by the clerk in charge shown in FIG. 15 may be omitted by making automatic determination through the detection or reading by the accepting box type judging sensor.

When the conditions for operation are determined, table setting is made so that transactions capable of being performed in accordance with the determined conditions for operation, for example, display columns such as ¥ DEPOSIT, ¥ WITHDRAWAL, $ DEPOSIT, $ WITHDRAWAL, —as shown in FIG. 16 are displayed on the transaction display unit 107 shown in FIG. 1 (step S6). Further, the control unit 10 of the bill deposit/withdrawal mechanism 1 is informed of the determined setting conditions as table information (step S7), thereby completing the operation setting.

In the present example, the input one by one is made on the display screen set by the clerk in charge as shown in FIG. 15. In many cases, however, the kinds of setting conditions are limited to several kinds. Therefore, if the change of setting by the clerk in charge is made, for example, in such a manner that possible setting conditions are tabulated as operating modes 1, 2, 3 and 4, as shown in FIG. 17 or 18 and the clerk in charge selects one mode from that table, the operability is improved. The operating modes 1 and 2 shown in FIGS. 17 and 18 by way of example are examples of selection in a machine which handles Japanese yen bills and U.S. dollar bills at a banking organ in Japanese territory, and the operating modes 3 and 4 are examples of selection in a machine which handles Singapore bills having many kinds of bills.

With the construction mentioned in the foregoing, it becomes possible to select or combine accepting boxes inclusive of the deposit box 6, the withdrawal box 7, the recycle box 8, the reject box 9 and the load/recovery box 11 arbitrarily in accordance with working environments, thereby enabling the selection of bill kinds, the selection of transactions including only deposit function, only withdrawal function and deposit/withdrawal function and so forth, and the selection of improved functions including recycle function, load/recovery function and so forth. When the setting is changed by the clerk in charge under operation of the machine, there is a possibility that an erroneous manipulation may be generated because the deposit box 6 and the reject box 9 are compatible with each other, the recycle box 8 and the load/recovery box 11 are compatible with each other, and the withdrawal box 7 is such that in the case where a plurality of withdrawal boxes 7 are mounted, they are compatible with each other. However, by providing a display unit and discriminator means for each accepting box to display and store information including the distinction of bill box, the distinction of bill kind, the number of accepted bills, and so forth and detecting or reading that information from each accepting box by the control unit 10, it is possible to contemplate the improvement on handling, the prevention of erroneous attachment/detachment and the improvement on strictness of cash management.

According to the present invention, it is possible to realize a bill deposit/withdrawal machine in which the types of accepting boxes mounted or the number of types can simply be increased or decreased in accordance with working environments and the setting of a transaction operation based on transaction types or bill kinds can easily been made in accordance with the types or the number of mounted accepting boxes.

What is claimed is:

1. A bill transaction machine for transacting a bill, comprising:

- a deposit/withdrawal port for accepting bills inputted by a user or delivering bills to the user;
- a bill discriminating unit for discriminating bills;
- a plurality of detachable accepting boxes, having the same shapes and sizes, for accepting bills to be transacted;
- a bill transport path for transporting the bills between the deposit/withdrawal port and the accepting boxes through the bill discriminating unit; and
- a control unit for
  - controlling operations of the deposit/withdrawal port, the bill discriminating unit, and the plurality of accepting boxes,
  - controlling a transaction for deposit and withdrawal of bills in the bill transaction machine, and
  - setting a condition for operation by which the bill transaction machine permits one of a deposit transaction, a withdrawal transaction, and a transaction including both deposit and withdrawal to be performed;
- wherein the bill transaction machine permits at least one of
  - dedicated deposit boxes having only a structure for accepting bills transported through the bill transport path,
  - dedicated withdrawal boxes having only a structure for discharging bills contained therein into the bill transport path, and
  - recycle boxes having a structure for accepting bills transported on the bill transport path and for discharging bills contained therein into the bill transport path to be selected and mounted as the plurality of accepting boxes in the bill transaction machine; and

- wherein the control unit controls the bill transaction machine as one of
  - a dedicated machine for deposit,
  - a dedicated machine for withdrawal, and
  - a deposit/withdrawal machine in accordance with the condition for operation.

2. A bill transaction machine according to claim 1, wherein each of the accepting boxes is one selected from accepting boxes containing a reject box and a load/recovery box for delivering bills to the recycle box or accepting bills recovered from the recycle box, in addition to the deposit box, the withdrawal box, and the recycle box.

3. A bill transaction machine according to claim 1, wherein the control unit includes a clerk operation unit; and

- wherein the control unit sets the condition for operation in accordance with input from the clerk operation unit.

4. A bill transaction machine according to claim 3, wherein the clerk operation unit inputs the type of accepting boxes and the kind of bills manually; and

- wherein the control unit sets the condition for operation in accordance with the type of accepting boxes and the kind of bills inputted from the clerk operation unit.

5. A bill transaction machine according to claim 4, wherein the accepting boxes include an indicator unit for indicating the type of accepting boxes and the kind of bills; and

- wherein the control unit judges whether or not the type of accepting boxes and the kind of bills inputted from the clerk operation unit are identical with the type of accepting boxes and the kind of bills indicated from the accepting boxes mounted in the bill transaction machine.

6. A bill transaction machine according to claim 1, wherein the control unit includes

- a clerk operation unit, and
- a memory unit for storing restriction conditions relative to the accepting boxes;
- wherein the clerk operation unit inputs the type of accepting boxes and the kind of bills manually; and
- wherein the control unit sets the condition for operation in accordance with input from the clerk operation unit and the restriction conditions stored in the memory unit.

7. A bill transaction machine according to claim 6, wherein the control unit judges in response to input from the clerk operation unit whether or not the type of accepting boxes and the kind of bills inputted from the clerk operation unit satisfy the restriction conditions stored in the memory unit.

8. A bill transaction machine according to claim 1, further comprising a transaction display, mounted on a front panel of the bill transaction machine, for displaying types of possible transactions;

- wherein the control unit displays the types of possible transactions in the transaction display in accordance with the set condition for operation.

9. A bill transaction machine according to claim 1, wherein the control unit includes

- a clerk operation unit, and
- a table for storing a plurality of operation modes of the bill transaction machine, each of the operation modes including the type of the accepting boxes mounted in the bill transaction machine and the kind of bills;
- wherein the clerk operation unit inputs to select one of the operation modes stored in the table; and
- wherein the control unit sets the condition for operation in accordance with the operation mode selected by the input from the clerk operation unit.

10. A bill transaction machine according to claim 9, wherein the accepting boxes include an indicator unit for indicating the type of the accepting boxes and the kind of bills; and wherein the control unit judges whether or not the type of accepting boxes and the kind of bills inputted from the clerk operation unit are identical with the type of accepting boxes and the kind of bills indicated from the accepting boxes mounted in the bill transaction machine.

11. A bill transaction machine according to claim 1, wherein the accepting boxes include an indicator unit for indicating the type of accepting boxes and the kind of bills; and wherein the control unit automatically sets the condition for operation in accordance with the type of accepting boxes and the kind of bills indicated from the accepting boxes mounted in the bill transaction machine.

12. A bill transaction machine according to claim 11, wherein the control unit includes a memory unit for storing restriction conditions relative to the accepting boxes; and wherein the control unit sets the condition for operation in accordance with the type of accepting boxes and the kind of bills indicated from the accepting boxes mounted in the bill transaction machine and the restriction conditions stored in the memory unit.

13. A bill transaction machine according to claim 11, wherein the control unit sets the bill transaction machine to the condition for operation for handling only deposit when the deposit boxes are selected as all of the accepting boxes to be mounted in the bill transaction machine.

14. A bill transaction machine according to claim 11, wherein the control unit sets the bill transaction machine to the condition for operation for handling only withdrawal when the withdrawal boxes are selected as all of the accepting boxes to be mounted in the bill transaction machine.

15. A bill transaction machine according to claim 11, wherein the control unit sets the bill transaction machine to the condition for operation for handling both deposit and withdrawal when the recycle box is selected as at least one of the accepting boxes to be mounted in the bill transaction machine.

16. A bill transaction machine according to claim 11, further comprising a transaction display, mounted on a front panel of the bill transaction machine, for displaying types of possible transactions;

wherein the control unit displays the types of possible transactions in the transaction display in accordance with the set condition for operation.

17. A bill transaction machine for transacting bills by operation of a user, comprising:

an input unit for receiving an instruction for a transaction from a user;

a port for delivering bills inputted by a user or discharging bills to a user;

a bill discriminating unit for discriminating bills;

a plurality of accepting boxes for accepting bills to be transacted, each of the plurality of accepting boxes being mounted detachably and having the same outside dimension; and a bill transport path for transporting bills between the plurality of accepting boxes and the port while passing them through the bill discriminating unit;

wherein the bill transaction machine selects at least one of dedicated deposit boxes for accepting bills under travel on the bill transport path, dedicated withdrawal boxes for delivering bills contained therein to the bill transport path, and recycle boxes capable of accepting bills transported on the bill transport path and capable of delivering bills contained therein to the bill transport path, and mounts the selected one in the bill transaction machine as the plurality of accepting boxes;

wherein the bill transaction machine further comprises a control unit for controlling operations of the port, the bill discrimination unit, the bill transport path, and the plurality of accepting boxes, and setting a condition for operation permitting the bill transaction machine to perform any one of a deposit transaction, a withdrawal transaction, and a transaction including both deposit and withdrawal;

wherein the control unit performs a transaction in response to the instruction received by the input unit;

wherein the bill transaction machine further comprises a transaction display for displaying types of possible transactions to the user; and wherein the control unit controls the bill transaction machine as one of a dedicated deposit machine, a dedicated withdrawal machine, and a deposit/withdrawal machine in accordance with the condition for operation set therein, and causes the transaction display to display the types of possible transactions in the transaction display in accordance with the set condition for operation.

18. A bill transaction machine according to claim 17, wherein the control unit includes a clerk operation unit for inputting the type of accepting boxes and the kind of bills manually; and wherein the control unit sets the condition for operation in accordance with input from the clerk operation unit.

19. A bill transaction machine according to claim 18, wherein the accepting boxes include an indicator unit for indicating the type of accepting boxes and the kind of bills;

wherein the clerk operation unit inputs the type of accepting boxes and the kind of bills manually; and wherein the control unit judges whether or not the type of accepting boxes and the kind of bills inputted from the clerk operation unit are identical with the type of accepting boxes and the kind of bills from a memory unit of the accepting boxes mounted in the bill transaction machine.

20. A bill transaction machine according to claim 17, wherein the control unit includes a clerk operation unit, and a memory unit for storing restriction conditions relative to the accepting boxes;

wherein the clerk operation unit inputs the type of accepting boxes and the kind of bills manually; and wherein the control unit sets the condition for operation in accordance with input from the clerk operation unit and the restriction conditions stored in the memory unit.

21. A bill transaction machine according to claim 17, wherein the control unit includes a clerk operation unit, and a table for storing a plurality of operation modes of the bill transaction machine, each of the operation modes including the type of accepting boxes and the kind of bills;

wherein the clerk operation unit inputs to select one of the operation modes stored in the table; and wherein the control unit sets the condition for operation in accordance with the operation mode selected by input from the clerk operation unit.

22. A bill transaction machine according to claim 21, wherein the accepting boxes include a memory unit for storing the type of accepting boxes and the kind of bills; and wherein the control unit judges whether or not the type of accepting boxes and the kind of bills inputted from the clerk operation unit are identical with the type of accepting boxes and the type of bills from the memory unit of the accepting boxes mounted in the bill transaction machine.

23. A bill transaction machine according to claim 17, wherein the control unit includes a memory unit for storing restriction conditions relative to the accepting boxes; and wherein the control unit detects the type of accepting boxes mounted in the bill transaction machine and the kind of bills, and automatically sets the condition for operation in accordance with the detected type of accepting boxes and kind of bills and the restriction conditions stored in the memory unit.

24. A bill transaction machine according to claim 23, further comprising a transaction display for displaying types of possible transactions;

wherein the control unit displays the types of possible transactions in the transaction display in accordance with the set condition for operation.

25. A method of setting a condition for operation in a bill transaction machine for transacting a bill, the bill transaction machine including a plurality of accepting boxes for accepting bills to be transacted, each of the accepting boxes having the same outside dimension and being mounted detachably, the bill transaction machine selecting at least one of dedicated deposit boxes for accepting bills under travel on a bill transport path, dedicated withdrawal boxes for delivering bills contained therein to the bill transport path, and recycle boxes capable of accepting bills transported on the bill transport path and capable of delivering bills contained therein to the bill transport path, the bill transaction machine mounting the selected one in the bill transaction machine as the plurality of accepting boxes, each of the dedicated deposit boxes, the dedicated withdrawal boxes, and the recycle boxes having a type different from each other, the method comprising the steps of:

receiving the type of accepting boxes and the kind of bills inputted from a clerk operation unit;

judging whether or not the bill transaction machine can be operated based on previously stored restriction conditions in response to the inputted type of accepting boxes and kind of bills;

judging a relation of input contents and accepting boxes actually mounted; and deciding the condition for operation of the bill transaction machine if the relation is satisfied.

26. A method according to claim 25, further comprising the steps of:

setting a table for displaying possible transactions in a transaction display in accordance with the decided condition for operation; and setting the decided condition for operation in a table.

27. A method according to claim 25, further comprising the step of judging whether or not the inputted type of accepting boxes and kind of bills are identical with the type of accepting boxes and the kind of bills stored in a memory unit of the accepting boxes mounted in the bill transaction machine.

28. A method of setting a condition for operation in a bill transaction machine for transacting a bill, the bill transaction machine including a plurality of accepting boxes for accepting bills to be transacted, each of the accepting boxes having the same outside dimension and being mounted detachably, the bill transaction machine selecting at least one of dedicated deposit boxes for accepting bills under travel on a bill transport path, dedicated withdrawal boxes for delivering bills contained therein to the bill transport path, and recycle boxes capable of accepting bills transported on the bill transport path and capable of delivering bills contained therein to the bill transport path, the bill transaction machine mounting the selected one in the bill transaction machine as the plurality of accepting boxes, each of the dedicated deposit boxes, the dedicated withdrawal boxes, and the recycle boxes having a type different from each other, the method comprising the steps of:

detecting the type of the plurality of accepting boxes mounted in the bill transaction machine and the kind of bills to be accepted in the accepting boxes;

judging whether or not the bill transaction machine can be operated based on previously stored restriction conditions in response to the detected type of accepting boxes and kind of bills; and deciding the condition for operation of the bill transaction machine if the bill transaction machine can be operated.

29. A method according to claim 28, further comprising the steps of:

setting a table for displaying possible transactions in a transaction display in accordance with the decided condition for operation; and setting the decided condition for operation in a table.

* * * * *